United States Patent
Zhuang et al.

(10) Patent No.: US 11,283,354 B2
(45) Date of Patent: Mar. 22, 2022

(54) MULTI-LEVEL BOOST APPARATUS

(71) Applicant: SUNGROW POWER SUPPLY CO., LTD., Anhui (CN)

(72) Inventors: Jiacai Zhuang, Anhui (CN); Jun Xu, Anhui (CN); Bing Zhang, Anhui (CN); Peng Wang, Anhui (CN); Peng Wen, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 352 days.

(21) Appl. No.: 16/538,725

(22) Filed: Aug. 12, 2019

(65) Prior Publication Data

US 2020/0076302 A1    Mar. 5, 2020

(30) Foreign Application Priority Data

Aug. 29, 2018   (CN) .......................... 201810993253.1

(51) Int. Cl.
*H02M 3/158* (2006.01)
*H02M 1/00* (2006.01)

(52) U.S. Cl.
CPC ......... *H02M 3/158* (2013.01); *H02M 1/0061* (2013.01); *H02M 1/0003* (2021.05)

(58) Field of Classification Search
CPC .. H02M 3/158; H02M 1/0061; H02M 1/0003; H02M 7/4837; H02M 3/07; H02M 1/32; H02M 1/36; H02M 3/08
USPC ....................................................... 323/282
See application file for complete search history.

(56) References Cited

U.S. PATENT DOCUMENTS

| | | | |
|---|---|---|---|
| 7,023,186 B2 | 4/2006 | Yan | |
| 7,548,435 B2 | 6/2009 | Mao | |
| 8,604,757 B2 * | 12/2013 | Okuda | H02M 7/4837 323/225 |

(Continued)

FOREIGN PATENT DOCUMENTS

| | | |
|---|---|---|
| CN | 1731661 A | 2/2006 |
| CN | 101047335 A | 10/2007 |

(Continued)

OTHER PUBLICATIONS

Received STIC search report from EIC 2800 searcher John DiGeronimo on Jan. 22, 2020. (Year: 2020).*

(Continued)

*Primary Examiner* — Shawki S Ismail
*Assistant Examiner* — Htet Z Kyaw
(74) *Attorney, Agent, or Firm* — Harness, Dickey & Pierce, P.L.C.

(57) ABSTRACT

A multi-level boost apparatus. Voltage allocation among N first switches is achieved by arranging the N voltage dividing modules. It is prevented that the second one to the N-th one of the first switches break down and fail due to overvoltage. By arranging an (i−1)-th clamp branch at a common node between an (i−1)-th second switch and an i-th second switch, a voltage bore by the i-th second switch is clamped at a difference between a voltage across the fourth branch (namely, an output voltage of the multi-level boost apparatus) and a voltage across the corresponding clamp branch. The risk is avoided that a second one to the N-th one of the second switches break down due to overvoltage at an instant of being powered, in a case that the input voltage is low.

15 Claims, 19 Drawing Sheets

(56) References Cited

U.S. PATENT DOCUMENTS

| | | | |
|---|---|---|---|
| 11,025,163 B2* | 6/2021 | Yu | H02M 3/07 |
| 2006/0028186 A1 | 2/2006 | Yan | |
| 2006/0226816 A1* | 10/2006 | Wai | H02M 3/158 323/222 |
| 2007/0230228 A1 | 10/2007 | Mao | |
| 2013/0021011 A1* | 1/2013 | Okuda | H02M 3/158 323/282 |
| 2016/0126833 A1* | 5/2016 | Yatsu | H02M 3/156 323/312 |
| 2016/0285371 A1 | 9/2016 | Fu | |
| 2017/0133857 A1 | 5/2017 | Sun et al. | |
| 2019/0214904 A1* | 7/2019 | Yu | H02M 3/158 |
| 2020/0358356 A1* | 11/2020 | Shi | H02S 40/32 |

FOREIGN PATENT DOCUMENTS

| | | |
|---|---|---|
| CN | 101572503 A | 11/2009 |
| CN | 102624271 A | 8/2012 |
| CN | 104158208 A | 11/2014 |
| CN | 204302421 U | 4/2015 |
| CN | 205992854 U | 3/2017 |
| CN | 107070215 A | 8/2017 |
| CN | 108258899 A | 7/2018 |
| DE | 102014109048 A1 | 12/2015 |
| EP | 2219275 A1 | 8/2010 |
| JP | 2012239324 A | 12/2012 |
| JP | 2014036491 A | 2/2014 |

OTHER PUBLICATIONS

Attached foreign patent Muller Burkard et al. DE102014109048Translated with Espacenet. (Year: 2015).*
Attached foreign patent Kimura Tomoaki et al. JP2014036491 translated with Espacenet. (Year: 2014).*
European Search Report regarding Application No. 19191072.8 dated Jan. 31, 2020.

* cited by examiner

MULTI-LEVEL BOOST APPARATUS

The present application claims priority to Chinese Patent Application No. 201810993253.1, titled "MULTI-LEVEL BOOST APPARATUS", filed on Aug. 29, 2018 with the China National Intellectual Property Administration, which is incorporated herein by reference in its entirety.

FIELD

The present disclosure relates to the field of power electronics technology, and particularly, to a multi-level boost apparatus.

BACKGROUND

With an increase in a voltage of a power electronic converter system, a requirement on a withstand voltage of a relevant switching device is gradually raised. Given an influence of a performance of semiconductor technology and the like, multi-level technology has become a hot topic of researches due to a capability to achieve a change in high-voltage power by using a low-voltage level device at a low cost.

Shown in FIG. 1a is a topology of a main circuit of a conventional three-level boost apparatus of a flying-capacitor type. Under a normal condition, voltage stresses of K1, K2, D1 and D2 are all half of an output voltage Vout. Across each transistor, a withstand voltage when the circuit is started has a great difference from that when operation is in a steady state. Specifically, in a case that an input voltage Vin is higher than a withstand voltage of K2, K2 would break down and fail due to overvoltage. In a case that the input Vin is low and a difference Vout−Vin between the input and output voltages is greater than a withstand voltage of D2, D2 would break down and fail due to overvoltage. Therefore, there are great restrictive conditions for putting the solution shown in FIG. 1a into practice, and advantages of the topology cannot be fully developed.

Shown in FIG. 1b is a topology of an improved main circuit of a three-level boost apparatus of a flying-capacitor type. The circuit is better in addressing the issue that K1 and K2 divides the voltage equally when being powered, in a case that the output voltage Vout is provided by the input voltage Vin at startup. However, a voltage on D2 is still the difference Vout−Vin between the input and output voltages, in a case that the output voltage Vout is high and the input voltage Vin is low. Therefore, D2 still has a risk of breakdown due to overvoltage.

SUMMARY

A multi-level boost apparatus is provided according to the present disclosure, so as to address an issue that a device has a risk of breakdown at an instant of being powered due to overvoltage in case of a low input voltage in conventional technology.

To achieve the above objective, following technical solutions are provided according to the present disclosure.

A multi-level boost apparatus is provided, where a main circuit of the multi-level boost apparatus includes an input capacitor, an input inductor, a first branch, a second branch, a third branch, a fourth branch, and N−1 claim branches, and N is a positive integer greater that 1, and where:

a terminal of the input inductor is connected to a terminal of the input capacitor;

another terminal of the input inductor is connected to a terminal of the first branch and a terminal of the second branch, the first branch includes N first switches sequentially connected in series, a first one of the N first switches is connected to the input inductor, the second branch includes N second switches sequentially connected in series, and a first one of the N second switches is connected to the input inductor;

a common node between the first one and a second one of the N second switches is connected to a terminal of the third branch, the third branch includes N voltage dividing modules sequentially connected in series, and the N voltage dividing modules are configured to divide a voltage across the third branch;

a first one of the N voltage dividing modules includes a first capacitor;

for each positive integer i that is greater than 1 and smaller than or equal to N:

a common node between an (i−1)-th one of the N voltage dividing modules and an i-th one of the N voltage dividing modules is connected to a common node between an (i−1)-th one of the N first switches and an i-th one of the N first switches;

a common node between an (i−1)-th one of the N second switches and an i-th one of the second switches is connected to a terminal of an (i−1) one of the N−1 clamp branches, and the (i−1) one of the N−1 clamp branches is configured to reduce a voltage on the i-th one of the second branch;

another terminal of the second branch is connected to a terminal of the fourth branch, the terminal of the fourth branch and another terminal of the fourth branch are output terminals of the main circuit, and the fourth branch includes at least one output capacitor; and another terminal of the first branch, another terminal of the third branch, the another terminal of the fourth branch, and another terminal of each of the N−1 clamp branches are connected to another terminal of the input capacitor.

Preferably, there is N=2, a second one of the two voltage dividing modules includes a first controllable switch and a first resistor that are connected in series, and a common node between the first one of the two dividing modules and the second one of the two dividing modules are connected via a second controllable switch to a common node between the first one of the two first switches and a second one of the two first switches.

Preferably, there is N≥2, the i-th one of the N voltage dividing modules includes a controllable switch and a second capacitor that are connected in series for each positive integer i that is greater than 1 and smaller than or equal to N, and the second capacitor is charged in a default state of the controllable switch; where:

the multi-level boost apparatus further includes N−1 connection capacitors in case of N being greater than 2, where for each positive integer j that is smaller than N−1, a terminal of a j-th one of the N−1 connection capacitors is connected to a common node between a (j+1)-th one of the N second switches and a (j+2)-th one of the N second switches, and another terminal of the j-th one of the N−1 connection capacitors is connected to a common node between a (j+1)-th one of the N voltage dividing modules and a (j+2)-th one of the N voltage dividing modules.

Preferably, the N first switches are reverse-conducting transistors, the N second switches are diodes, and each controllable switch is a mechanical switch or a reverse-conducting transistor, where:

the input inductor and the second branch are arranged on a positive cable of the multi-level boost apparatus, and the common node between an (i−1)-th one of the N second switches and an i-th one of the N second switches is a node connecting a cathode of an (i−1)-th one of the diodes and an anode of an i-th one of the diodes, for each positive integer i that is greater than 1 and smaller than or equal to N; or the input inductor and the second branch are arranged on a negative cable of the multi-level boost apparatus, and the common node between an (i−1)-th one of the N second switches and an i-th one of the N second switches is a node connecting an anode of an (i−1)-th one of the diodes and a cathode of an i-th one of the diodes, for each positive integer i that is greater than 1 and smaller than or equal to N.

Preferably, each of the N−1 the clamp branches includes: a first diode and a first power source, and the first power source is configured to reduce a voltage across the i-th one of the second switches.

Preferably, the fourth branch includes N output capacitors sequentially connected in series, a first one of the N output capacitors is connected to the input capacitor, and an N-th one of the output capacitors is connected to the second branch, and each of the N−1 clamp branches includes a first diode, where:

the input inductor and the second branch are arranged on a positive cable of the multi-level boost apparatus, and a cathode of the first diode in the (i−1)-th one of the N−1 clamp branches is connected to a common node between the (i−1)-th one of the N second switches and the i-th one of the N second switches, and an anode of the first diode in the (i−1)-th one of the N−1 clamp branches is connected to a common node between an (i−1)-th one of the N output capacitors and an i-th one of the N output capacitors, for each positive integer i that is greater than 1 and smaller than or equal to N; or the input inductor and the second branch are arranged on a negative cable of the multi-level boost apparatus, and an anode of the first diode in the (i−1)-th one of the N−1 clamp branches is connected to a common node between the (i−1)-th one of the N second switches and the i-th one of the N second switches, and a cathode of the first diode in the (i−1)-th one of the N−1 clamp branches is connected to a common node between an (i−1)-th one of the N output capacitors and an i-th one of the N output capacitors, for each positive integer i that is greater than 1 and smaller than or equal to N.

Preferably, the i-th one of the N voltage dividing modules further includes a first impedor connected in series with the controllable switch and the second capacitor, for each positive integer i that is greater than 1 and smaller than or equal to N, where the first impedor is a resistor, an inductor or a capacitor, or is a combination of at least two of a resistor, an inductor and a capacitor.

Preferably, N is equal to 2, the fourth branch includes two output capacitors connected in series, and a controller of the multi-level boost apparatus is configured to:

control the two first switches in the first branch to be turned off in response to Vin being switched in and Vout=Vc1=Vc2=0, and then control the main circuit to enter a normal operating mode in response to Vout=Vin;

control the two first switches in the first branch to be turned off in response to Vin being switched in, Vout/2≤Vin≤Vout and Vc1=Vc2=0; then control the two first switches in the first branch to be pulsingly turned on in an interleaved manner in response to Vc1=Vc2=Vin/2, until Vc1+Vc2=Vout; and then control the main circuit to enter the normal operation mode in response to Vc1+Vc2=Vout;

control the two first switches in the first branch to be turned off in response to Vin being switched in, Vout/4≤Vin≤Vout/2 and Vc1=Vc2=0; then control a second one of the two first switches in the first branch to be turned off, and the first one of the two first switches be turned on pulsingly, in response to Vc1=Vc2=Vin/2; then control the two first switches in the first branch to be pulsingly turned on in an interleaved manner in response to Vc1>Vco1, until Vc1+Vc2=Vout; and then control the main circuit to enter the normal operation mode in response to Vc1+Vc2=Vout; and control the second one of the two first switches in the first branch to be turned off, control the first one of the two first switches to be turned on pulsingly; and control the controllable switch to be turned on, to discharge the second capacitor, in response to Vc1=Vout/2<Vc2 and the main circuit being in the normal operation mode; and where Vout is a voltage across the fourth branch, Vc1 is a voltage across the first capacitor, Vc2 is a voltage across the second capacitor, Vin is an input voltage of the multi-level boost apparatus, Vco1 is a voltage across one of the two output capacitors that is connected to the input capacitor, the first capacitor and the second capacitor are equal in capacitance, and capacitance of the one of the two output capacitors is three times the capacitance of another of the two output capacitors.

Preferably, the first impedor is the inductor, and the i-th one of the N voltage dividing module further includes a discharge branch configured to provide a discharge loop for the inductor, for each positive integer i that is greater than 1 and smaller than or equal to N.

Preferably, the discharge branch includes a second diode and a second impedor that are connected in series, and the second impedor is a resistor, a capacitor, or a combination of a resistor and a capacitor.

Preferably, the discharge branch includes a second diode and a second power source that are connected in series, and the second power source is configured to receive power from the inductor.

Preferably, the fourth branch includes multiple output capacitors sequentially connected in series, and the second power source includes all or a part of the multiple output capacitors in the fourth branch.

Preferably, N is equal to 2, the fourth branch includes two output capacitors connected in series, and a controller of the multi-level boost apparatus is configured to:

control the two first switches in the first branch to be turned off in response to Vin being switched in and Vout=Vc1=Vc2=0, and then control the main circuit to enter a normal operating mode in response to Vout=Vin;

control the two first switches in the first branch to be turned off in response to Vin being switched in, Vout/2≤Vin≤Vout and Vc1=Vc2=0; then control the two first switches in the first branch to be pulsingly turned on in an interleaved manner in response to Vc1=Vc2=Vin/2, until Vc1+Vc2=Vout; and then control the main circuit to enter the normal operation mode in response to Vc1+Vc2=Vout;

control the two first switches in the first branch to be turned off in response to Vin being switched in, Vout/4≤Vin≤Vout/2 and Vc1=Vc2=0; then control a second one of the two first switches in the first branch to be turned off, and the first one of the two first switches be turned on pulsingly, in response to Vc1=Vc2=Vin/2; then control the two first switches in the first branch to be pulsingly turned on in an interleaved manner in response to Vc1>Vco1, until Vc1+Vc2=Vout; and then control the main circuit to enter the normal operation mode in response to Vc1+Vc2=Vout; and control the second one of the two first switches in the first branch to be turned off, control the first one of the two first switches to be turned on pulsingly with a period of T1; and control the controllable switch to be turned on pulsingly with a period of T2, to discharge the second capacitor, in response to Vc1=Vout/2<Vc2 and the main circuit being in the normal operation mode, where T2 is smaller than T1; and where Vout is a voltage across the fourth branch, Vc1 is a voltage across the first capacitor, Vc2 is a voltage across the second capacitor, Vin is an input voltage of the multi-level boost apparatus, Vco1 is a voltage across one of the two output capacitors that is connected to the input capacitor, the first capacitor and the second capacitor are equal in capacitance, and capacitance of the one of the two output capacitors is three times the capacitance of another of the two output capacitors.

With the multi-level boost apparatus according to the present disclosure, voltage allocation among the N first switches is achieved by arranging the N voltage dividing modules. It is prevented that the second one to the N-th one of the first switches break down and fail due to overvoltage. By arranging the (i−1)-th clamp branch at a common node between the (i−1)-th second switch and the i-th second switch, the voltage bore by the i-th second switch is clamped at a difference between the voltage across two terminals of the fourth branch (namely, the output voltage of the multi-level boost apparatus) and the voltage across the corresponding clamp branch. Thereby, the risk is avoided that the second one to the N-th one of the second switches break down due to overvoltage at an instant of being powered, in a case that the input voltage is low.

BRIEF DESCRIPTION OF THE DRAWINGS

For clearer illustration of the technical solutions according to embodiments of the present disclosure or conventional techniques, hereinafter are briefly described the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION

Figure 1A:
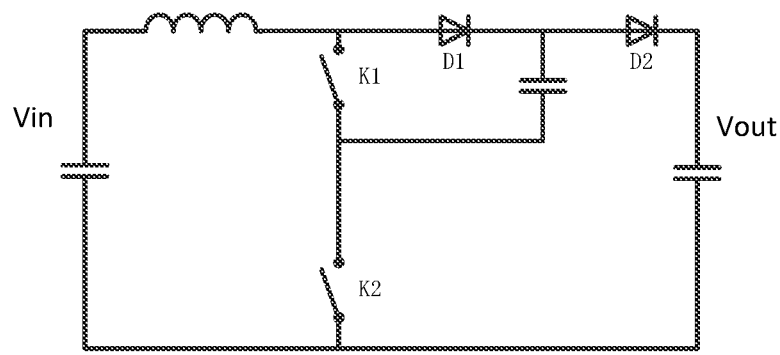
FIGS. 1a and 1b are schematic structural diagrams of main circuits of two multi-level boost apparatuses in conventional technology.

Hereinafter technical solutions in embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

A multi-level boost apparatus is provided according to the present disclosure, so as to address an issue in conventional technology that a device has a risk of breakdown due to overvoltage at an instant of being powered under a high input voltage.

In practice, a multi-level boost apparatus generally includes a main circuit, a voltage-and-current detection device, a controller, and the like. Specifically, the main circuit of the multi-level boost apparatus may be as shown in FIG. 2a to FIG. 2e, including: an input capacitor Cin, an input inductor L1, a first branch, a second branch, a third branch, a fourth branch and N−1 clamp branches. N is a positive integer greater than 1.

A terminal of the input inductor L1 is connected to a terminal of the input capacitor Cin.

Another terminal of the input inductor L1 is connected to a terminal of the first branch and a terminal of the second branch. The first branch includes N first switches (such as K11 and K12 in FIGS. 2a to 2d, or K11, K12 and K13 in FIG. 2e) sequentially connected in series. The first switch K11 connected to the input inductor L1 is the 1st first switch. The second branch includes N second switches (such as D01 and D02 in FIGS. 2a to 2d, or D01, D02 and D03 in FIG. 2e) sequentially connected in series. The second switch D01 connected to the input inductor L1 is the 1st second switch.

A common node between the 1st second switch D01 and the 2nd second switch D02 is connected to a terminal of the third branch. The third branch includes N voltage dividing modules sequentially connected in series. The N voltage dividing modules are configured to divide a voltage across the third branch.

A common node between an (i−1)-th voltage dividing module and an i-th voltage dividing module is connected to a common node between an (i−1)-th first switch and an i-th first switch, for each positive integer i that is greater than 1 and smaller than or equal to N.

The 1st voltage dividing module includes a first capacitor C1.

A common node between the (i−1)-th second switch and the i-th second switch is connected to a terminal of the (i−1)-th clamp branch. The (i−1)-th clamp branch is configured to reduce a voltage across the i-th second switch. As shown in FIGS. 2a to 2d, a common node between D01 and D02 is connected to the first clamp branch (including D11 and DC11), and the 1st clamp branch is configured to reduce a voltage across the 2nd second switch D02. As shown in FIG. 2e, a common node between D01 and D02 is connected to the 1st clamp branch (including D11 and DC11), the 1st clamp branch is configured to reduce a voltage across the 2nd second switch D02, a common node between D02 and D03 is connected to the 2nd clamp branch (including D12 and DC12), and the 2nd clamp branch is configured to reduce a voltage across the 3rd second switch D03.

Another terminal of the second branch is connected to a terminal of the fourth branch. Two terminals of the fourth branch are output terminals of the main circuit. A voltage across the two terminals of the fourth branch is an output voltage of the main circuit. The fourth branch includes at least one output capacitor (such as Cout in FIGS. 2a to 2e).

Another terminal of the first branch, another terminal of the third branch, the another terminal of the fourth branch, and another terminal of each of the N−1 clamp branches are all connected to another terminal of the input capacitor Cin.

Figure 2A:
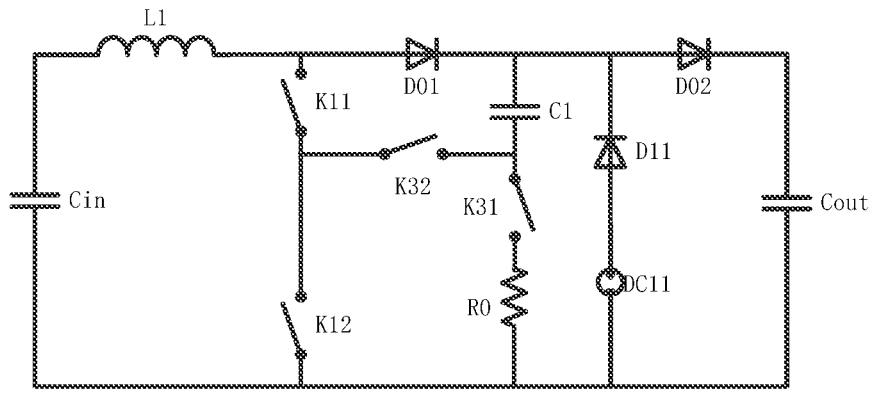
FIGS. 2a to 2d are four schematic structural diagrams of main circuits of three-level boost apparatuses according to an embodiment of the present disclosure.
Figure 2B:
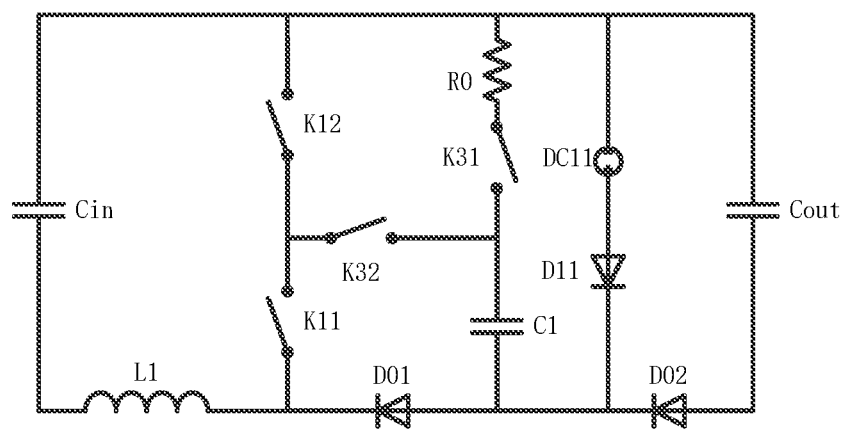

As shown in FIG. 2a and FIG. 2b, there is N=2. In such case, a 2nd voltage dividing module includes a first controllable switch K31 and a first resistor R0 that are connected in series.

A common node between the 1st voltage dividing module and the 2nd voltage dividing module is connected via a second controllable switch K32 to a common node of the 1st first and a 2nd first switch.

Figure 2C:
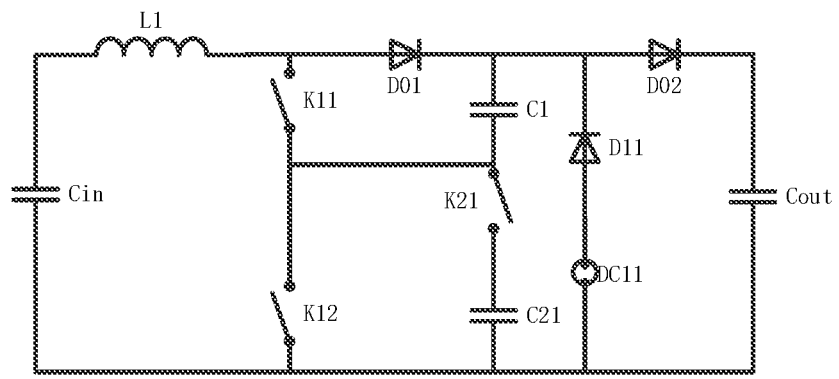
Figure 2D:
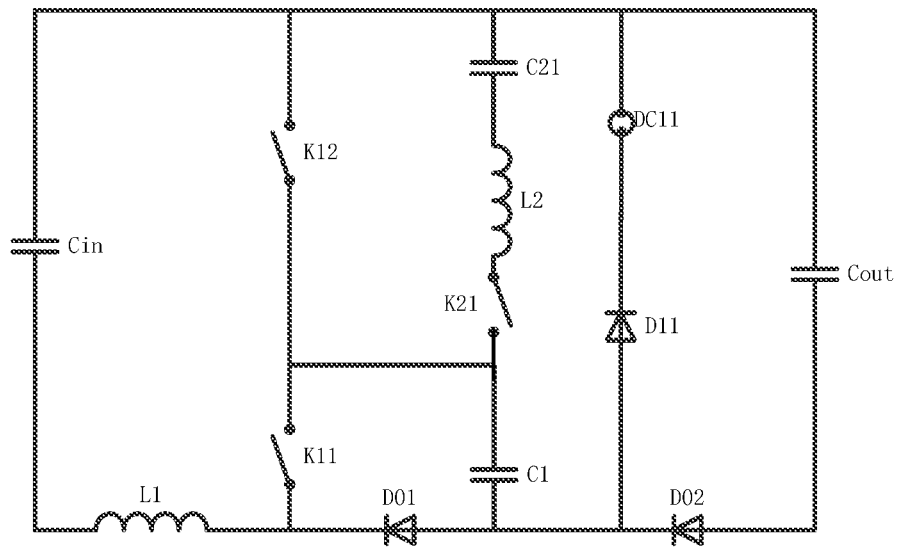
Figure 2E:
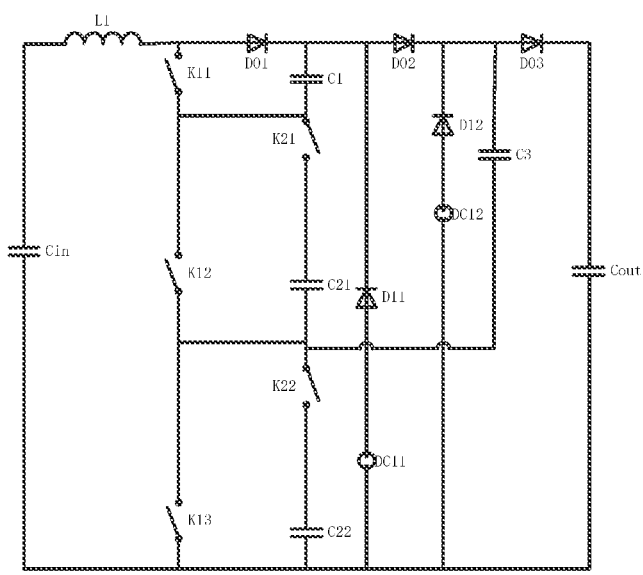
FIG. 2e is a schematic structural diagram of a main circuit of a five-level boost apparatus according to an embodiment of the present disclosure.

As shown in FIG. 2c to FIG. 2e, there is N>2. The i-th voltage dividing module includes: a controllable switch (K21 in FIG. 2c and FIGS. 2d, or K21 and K22 in FIG. 2e) and a second capacitor (C21 in FIG. 2c and FIGS. 2d, or C21 and C22 in FIG. 2e) that are connected in series. The second capacitor is charged in a default state of the controllable switch. In practice, positions of the controllable switch and the second capacitor are exchangeable, which are not limited to cases shown in FIGS. 2c to 2e, and fall within the protection scope of the present disclosure.

As shown in FIG. 2e, In a case that N is greater than 2, the multi-level boost apparatus further includes N−1 connection capacitors (such as C3 in FIG. 2e). A terminal of the j-th connection capacitor is connected to a common node between the (j+1)-th second switch and the (j+2)-th second switch, and another terminal of the j-th connection capacitor is connected to a common node between the (j+1)-th voltage dividing module and the (j+2)-th voltage dividing module, for each positive integer j that is smaller than N−1.

In practice, the first switch may be a reverse-conducting transistor, and the second switch may be a diode. Each controllable switch (such as K31 and K32 in FIGS. 2a and 2b, K21 in FIGS. 2c and 2d, and K21 and K22 in FIG. 2e) may be a normally-on mechanical switch, or a reverse-conducting transistor for charging, in a default state, the second capacitor in a same voltage dividing module. The reverse-conducting transistor may be a MOSFET, a JFET, an IGBT integrated with an antiparallel diode, or the like, which is not specifically limited herein and fall within the protection scope of the present disclosure based on an application environment.

In a case that the input inductor L1 and the second branch are arranged on a positive cable of the multi-level boost apparatus, as shown in FIGS. 2a and 2c, the common node between the (i−1)-th second switch and the i-th second switch is a node connecting a cathode of the (i−1)-th diode and an anode of the i-th diode.

In a case that the input inductor L1 and the second branch are arranged on a negative cable of the multi-level boost apparatus, as shown in FIGS. 2b and 2d, the common node between the (i−1)-th second switch and the i-th second switch is a node connecting an anode of the (i−1)-th diode and a cathode of the i-th diode.

FIGS. 2a and 2b are topologies in duality, and FIGS. 2c and 2d are topologies in duality. FIGS. 2a to 2d are all topologies of main circuits in case of N=2. The main circuits can achieve a three-level output. FIG. 2e is a topology of a main circuit in case of N=3, and the main circuit can achieve a five-level output. The dual topology for FIG. 2e and the topology of a main circuit in case of N>3 can be analogized according to the above cases, which are not shown herein and fall within the protection scope of the present disclosure.

Figure 1B:
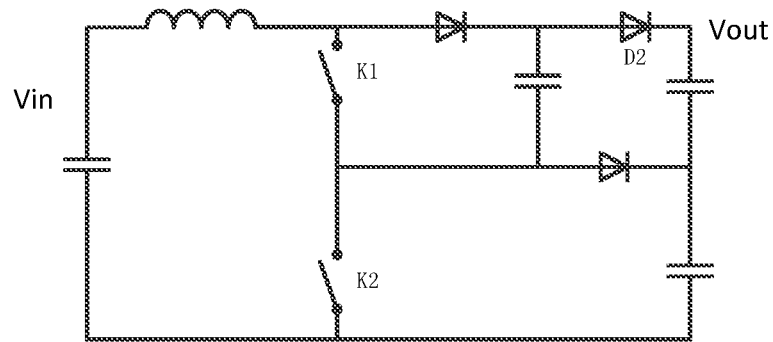

In a case that the input voltage is low and the output voltage is high, the 2nd second switch D02 may bear a voltage difference between the output voltage and the input voltage, in the solution of the conventional technology shown in FIG. 1b. Hence, a voltage stress on D02 may exceed the standard.

Based on the above, a clamp branch is added in the solution of the embodiment. The clamp branch includes a first diode (such as D11 as shown in FIG. 2c) and a first power source (such as DC11 as shown in FIG. 2c). FIG. 2c is taken as an example for illustration. A principle of overvoltage protection for the second switch is as follows. The clamp branch reduces the voltage on the second switch D02, and a highest voltage bore by the 2nd second switch D02 is adjusted to a difference between a voltage across the fourth branch (including Cout), namely, the output voltage of the multi-level boost apparatus, and a voltage across the clamp branch. Thereby, the voltage stress bore by the 2nd second switch D02 is reduced.

Specifically, as an example for topologies in duality, the input inductor L1 and the second branch are both arranged on a positive cable of the multi-level boost apparatus in FIG. 2c. A cathode of the first diode D11 is connected to a common node between corresponding two second switches (D01 and D02), an anode of the first diode D11 is connected to a positive terminal of the first power source DC11, and a negative terminal of the first power source DC11 is connected to the input capacitor Cin. The input inductor L1 and the second branch are both arranged on a negative cable of the multi-level boost apparatus in FIG. 2d. The anode of the first diode D11 is connected to the common node between the corresponding two second switches (D01 and D02), the cathode of the first diode D11 is connected to the negative terminal of the first power source DC11, and the positive terminal of the first power source DC11 is connected to the input capacitor Cin. For the five-level topology as shown in FIG. 2e, K22, C22, D03, D12, DC12, and C3 are added on the basis of FIG. 2c. Connections among all devices refer to FIG. 2e, and are not further described herein. In addition, principles in the topologies shown in FIGS. 2a, 2b, 2d and 2e and other topologies are similar to the aforementioned content, which can be analogized and are not further described herein.

In practice, selection of the first power source is not specifically limited. The first power source may be an additional power source. Or, a part of the output voltage of the main circuit of the multi-level boost apparatus may serve as the first power source, to reduce the voltage on the corresponding second switch. Namely, in a case that the fourth branch includes N output capacitors (such as Co1 and Co2 in FIGS. 3a to 3d, or Co1, Co2 and Co3 in FIG. 3e) connected in series. The output capacitor connected to the input capacitor Cin is the 1st output capacitor (such as Co1 in FIGS. 3a to 3e), and the output capacitor connected to the second branch is the N-th output capacitor (such as Co2 in FIGS. 3a to 3d, and Co3 in FIG. 3e). The clamp branch includes a first diode.

Figure 3A:
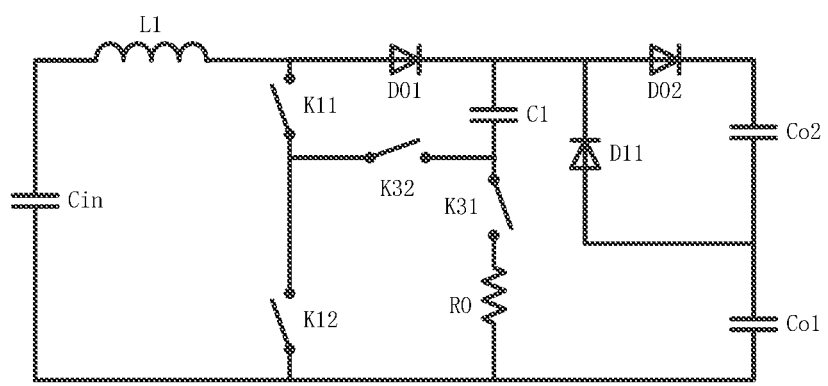
FIGS. 3a to 3d are four specific schematic structural diagrams of main circuits of three-level boost apparatuses according to an embodiment of the present disclosure.
Figure 3B:
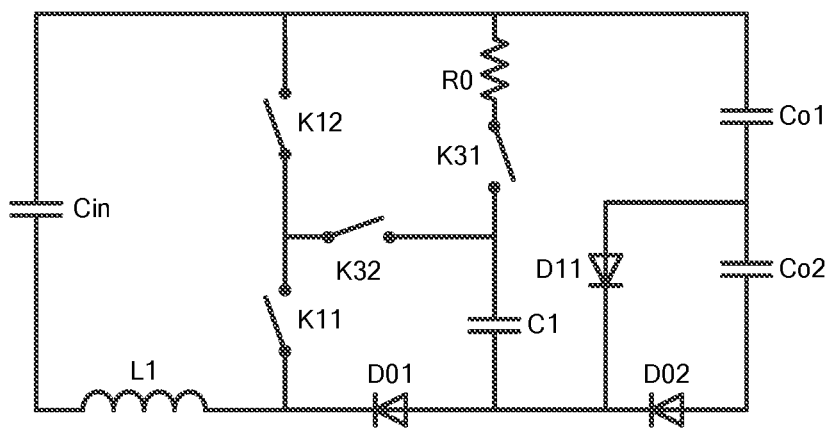
Figure 3C:
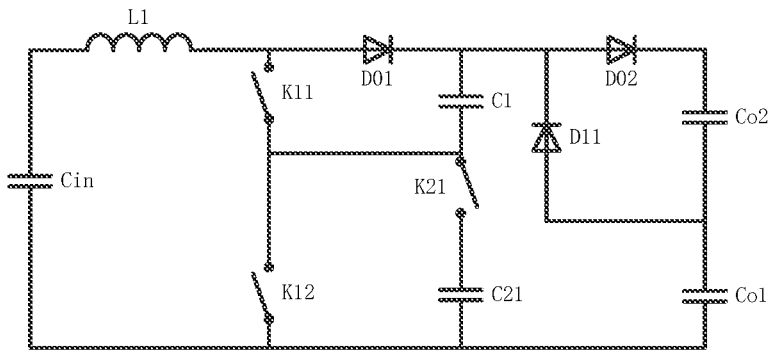
Figure 3D:
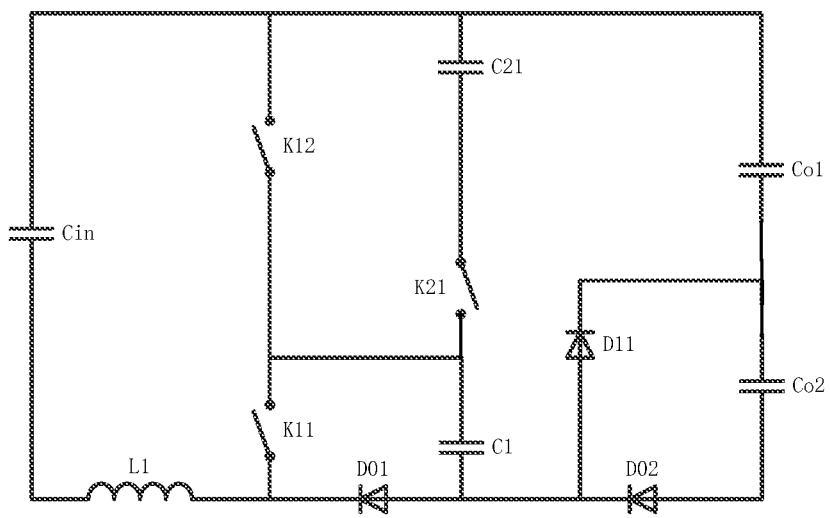
Figure 3E:
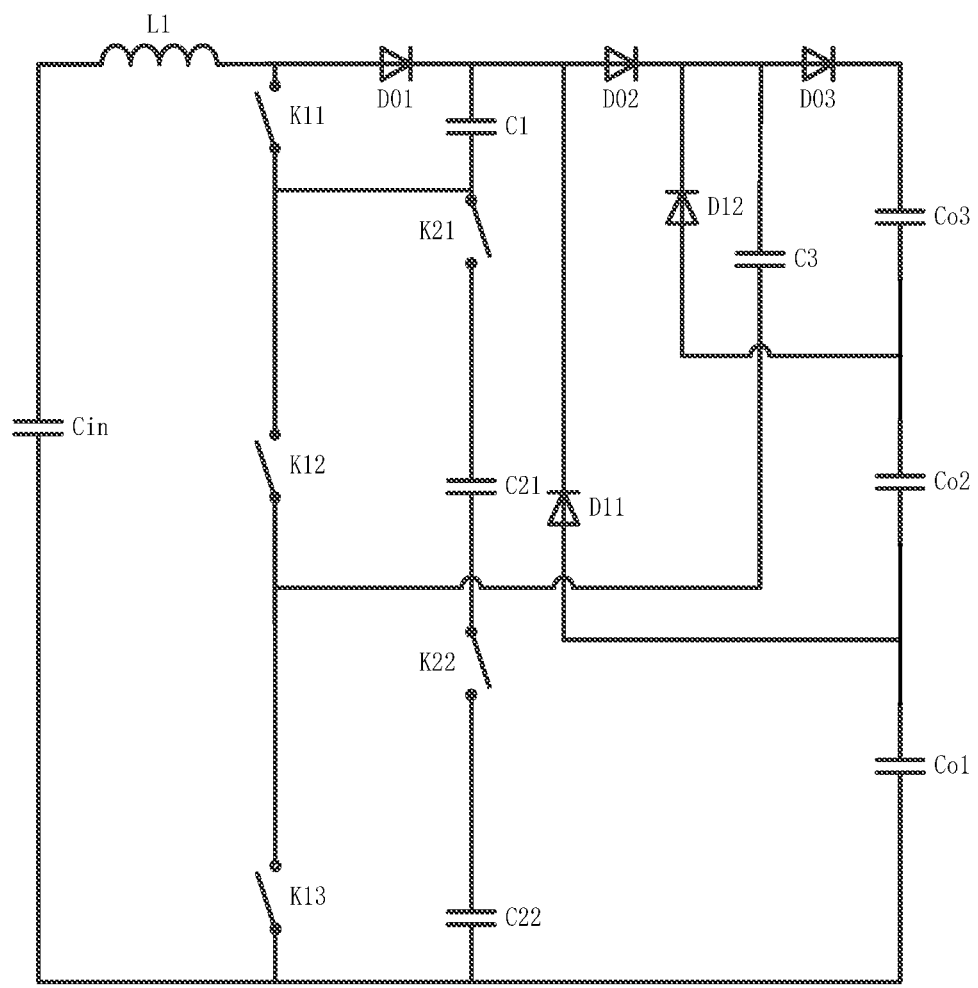
FIG. 3e is a specific schematic structural diagram of a main circuit of a five-level boost apparatus according to an embodiment of the present disclosure.

In a case that the input inductor L1 and the second branch are arranged on the positive cable of the multi-level boost apparatus, a cathode of the first diode in the (i−1)-th clamp branch is connected to the common node between the (i−1)-th second switch and the i-th second switch, and an anode of the first diode in the (i−1)-th clamp branch is connected to the common node between the (i−1)-th output capacitor and the i-th output capacitor. As shown in FIGS. 3a, 3c and 3e, a cathode of D11 is connected to the common node between D01 and D02, and an anode of D11 is connected to the common node between Co1 and Co2. As shown in FIG. 3e, a cathode of D12 is connected to the common node between D02 and D03, and an anode of D12 is connected to the common node between Co2 and Co3.

In a case that the input inductor L1 and the second branch are arranged on the negative cable of the multi-level boost apparatus, the anode of the first diode in the (i−1)-th clamp branch is connected to the common node between the (i−1)-th second switch and the i-th the second switch, and the cathode of the first diode in the (i−1)-th clamp branch is connected to the common node between the (i−1)-th output capacitor and the i-th output capacitor. As shown in FIGS. 3b and 3d, an anode of D11 is connected to the common node between D01 and D02, and a cathode of D11 is connected to the common node between Co1 and Co2.

FIG. 3a illustrates on the basis of FIG. 2a, FIG. 3b illustrates on the basis of FIG. 2b, FIG. 3c illustrates on the basis of FIG. 2c, FIG. 3d illustrates on the basis of FIG. 2d, and FIG. 3e illustrates on the basis of FIG. 2e. Configurations of the clamp branches in other topologies can be obtained by analogy, and are not further described herein.

A principle of overvoltage protection for the first switch in the embodiment is as follows.

In the topology shown in FIG. 2a, a controller controls the first controllable switch K31 to be turned off at start-up, and the first capacitor C1 can be pre-charged by the input voltage via the first controllable switch K31 and the first resistor R0. In a case that the voltage on the first capacitor C1 is charged to a suitable threshold, the controller controls the second controllable switch K32 to be turned on and the first controllable switch K31 to be turned off, so that the 1st first switch K11 is connected in parallel with the first capacitor C1. Thereby, the voltage across the 1st first switch K11 is raised, and the voltage across the second first switch K12 is lowered. The voltages across the two first switches are both within a safe range, thereby preventing the second first switch K12 from breaking down due to overvoltage at start-up.

Among the topologies shown in FIGS. 2c to 2e, the topology shown in FIG. 2c is taken as an example for illustrate. Since parasitic capacitance of the two first switches K11 and K12 are much smaller than the first capacitor C1 and the second capacitor C21, voltage division of K11 and K12 on the input voltage at start-up can be ignored with respect to the first capacitor C1 and the second capacitor C21. Therefore, voltages bore by the two first switches K11 and K12 are determined by voltages across the first capacitor C1 and the second capacitor C21, respectively. The problem that the input voltage is completely bore by K2 in conventional technology, as shown in FIG. 1, is solved.

In view of the above, the multi-level boost apparatus according to the embodiment clamps the voltage on the i-th second switch at the difference between the voltage across the fourth branch (i.e., the output voltage of the multi-level boost apparatus) and the voltage across the corresponding clamp branch, by arranging the i-th clamp branch at a common node between the (i−1)-th second switch and the i-th second switch. Thereby, the risk is avoided that the 2nd second switch to the N-th second switch break down due to overvoltage at an instant of being power, in a case that the input voltage is low. Moreover, N voltage dividing modules are arranged to divide a voltage between the N first switches, and it is avoided that the 2nd first switch to the N-th first switch break down due to overvoltage. Namely, the embodiment adopts fewer devices to address the issue of excessive voltage stress on the switching transistor of the conventional multi-level boost circuit of a flying-capacitor type. Devices with lower withstand voltage can be selected for all the switching transistors, and reliable operation of the system operation guaranteed within a wide input range of the circuit. Since the circuit operates at multiple levels, a volume and a cost of relevant filter components can be well controlled, rendering the system a great advantage in cost performance.

In the solution shown in the above embodiment, in a case that the main circuit of the multi-level boost apparatus is operating, the voltage on the second capacitor (such as C21 in FIGS. 2c, 2d, 3c and 3d, and C21 and C22 in FIGS. 2e and 3e) in each voltage dividing module exceeds a set limit under some special working conditions, and a sum of the voltages on the first capacitor and all the second capacitors exceeds the output voltage of the main circuit. In a case that the controllable switch in each voltage dividing module is turned on to discharge the corresponding second capacitor, a large current spike is introduced because the impedance of a loop is too small, and the second switches and the controllable switches in the loop are damaged.

Based on the above, another multi-level boost apparatus is provided according to another embodiment of the present disclosure. Preferably, on the basis of the foregoing embodiment, the i-th voltage dividing module further includes a first impedor (such as Z1 in FIG. 4a) connected in series with the controllable switch and the second capacitor. The first impedor is a resistor (such as R1 in FIG. 4b), an inductor (such as L2 in FIG. 4c), a capacitor (not shown), or a combination (not shown) of at least two of a resistor, an inductor and a capacitor.

In the embodiment, the problem of the current impulse caused by turning on the controllable switch to discharge the corresponding second capacitor can be solved by increasing the impedance of the loop.

Figure 4A:
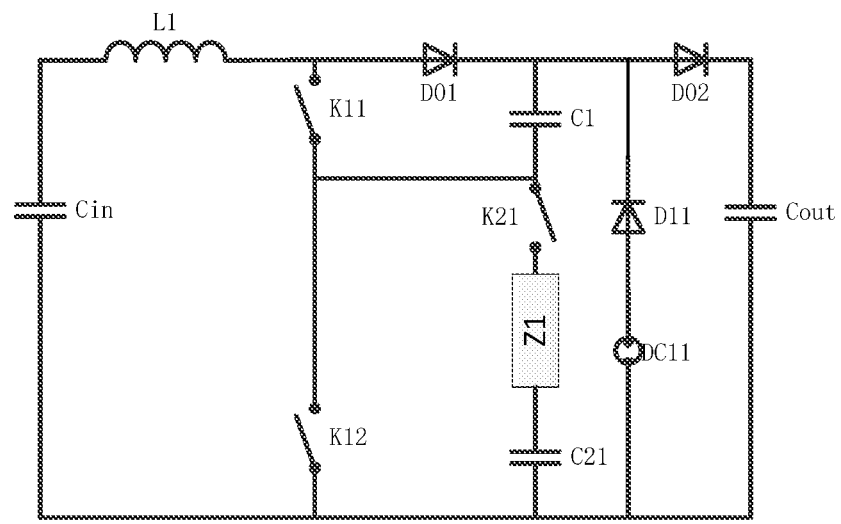
FIGS. 4a to 4c are three schematic structural diagrams of main circuits of five-level boost apparatuses according to an embodiment of the present disclosure.
Figure 4B:
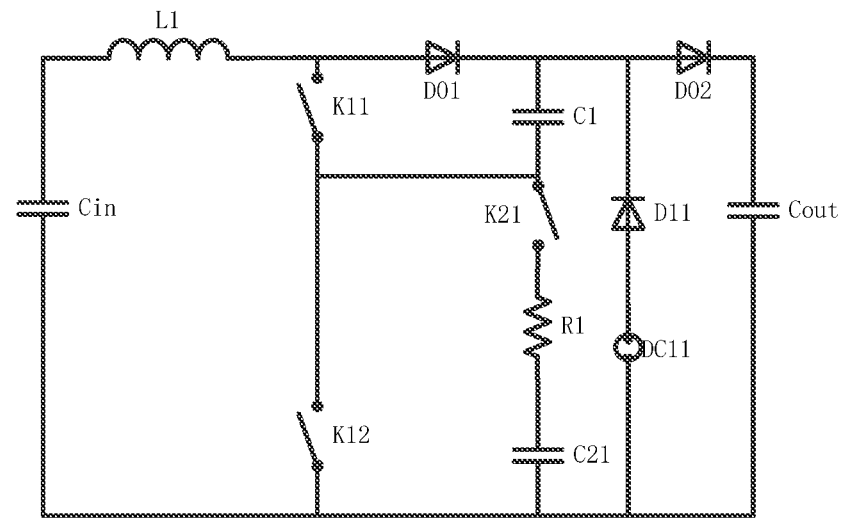
Figure 4C:
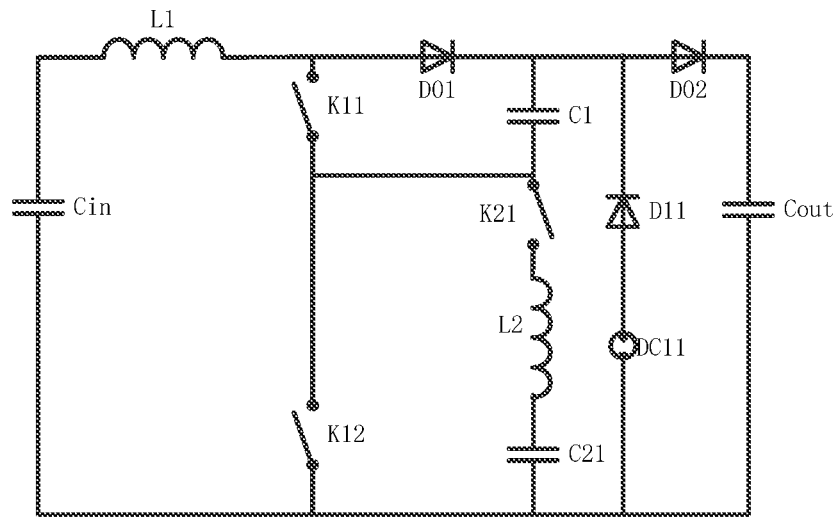

In practice, positions of the controllable switch, the first impedor and the second capacitor may be interchanged, which are not limited to the cases shown in FIG. 4a to FIG. 4c, and fall within the protection scope of the present disclosure. FIGS. 4a to 4c all illustrates on the basis of the topology shown in FIG. 2c. Structures of the voltage dividing modules in other topologies may be obtained by analogy, and are not enumerated for illustration herein.

The topology shown in FIG. 4c is taken as an example. There is N=2, and the fourth branch includes two output capacitors Co1 and Co2 connected in series. In such case, the controller of the multi-level BOOST device is configured as follows.

In case of Vout=Vc1=Vc2=0, the two first switches in the first branch are controlled to be turned off in response to Vin being switched in. Then, the main circuit is controlled to enter a normal operating mode in response to Vout=Vin.

In case of Vout/2≤Vin≤Vout and Vc1=Vc2=0, the two first switches in the first branch to be are controlled to be turned off in response to Vin being switched in. Then, the two first switches in the first branch are controlled to be pulsingly turned on in an interleaved manner in response to Vc1=Vc2=Vin/2, until Vc1+Vc2=Vout. Then, the main circuit is controlled to enter the normal operation mode in response to Vc1+Vc2=Vout.

In case of Vout/4≤Vin≤Vout/2 and Vc1=Vc2=0, the two first switches in the first branch is controlled to be turned off in response to Vin being switched in. Then, the 2nd first switches in the first branch is controlled to be turned off, and the 1st first switch is controlled to be turned on pulsingly, in response to Vc1=Vc2=Vin/2. Then, the two first switches in the first branch are controlled to be pulsingly turned on in an interleaved manner in response to Vc1>Vco1, until Vc1+Vc2=Vout. Then, the main circuit is controlled to enter the normal operation mode in response to Vc1+c2=Vout.

In case of Vc1=Vout/2<Vc2 and the main circuit being in the normal operation mode, the second one of the two first switches in the first branch is controlled to be turned off, the first one of the two first switches is controlled to be turned on pulsingly, and the controllable switch is controlled to be turned on, to discharge the second capacitor.

Vout is a voltage across the fourth branch. Vc1 is a voltage across the first capacitor. Vc2 is a voltage across the second capacitor. Vin is an input voltage of the multi-level boost apparatus. Vco1 is a voltage across one of the two output capacitors that is connected to the input capacitor.

It is noted that C1=C21 and 3×Co2=Co1 is set as a specific example in this embodiment. It should be appreciated that relationships between C1 and C21 and between Co1 and Co2 are not limited thereto. For example, Co2 may be N times Co1, where N≥2, in other embodiments of the present disclosure.

Figure 5:
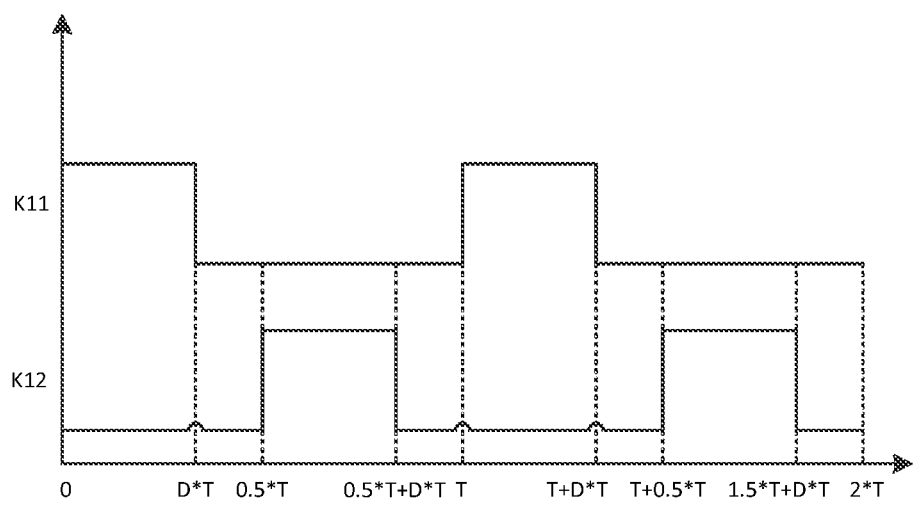
FIG. 5 is a waveform graph of pulses received by two first switches in a main circuit of a three-level boost apparatus according to another embodiment of the present disclosure.

K11 and K12 are turned on in an interleaved manner, in a case that the main circuit enters the normal operating mode. The normal operating mode refers to an operating mode other than the controlling mode specified above. The boost device operates normally in a closed-loop manner in the normal operating mode. Waveforms of pulses for the two switches are shown in FIG. 5. T is a period of the pulses, and D is a duty cycle of the pulses.

Other principles are same as the above embodiments, and are not further described herein.

In the application case as shown in FIG. 4c, a current is formed on the inductor L2 in a case that K21 is turned on. In a case that there is no additional loop for freewheeling and K21 is turned off, an excessive voltage is induced on the inductor L2, damaging K21. Therefore, another multi-level boost apparatus is provided according to another embodiment of the present disclosure. Preferably, on the basis of the aforementioned embodiment, in a case that the first impedor is an inductor, the i-th voltage dividing module further includes a discharge branch configured to provide a discharge loop for the inductor. Thereby, the problem is addressed that the inductor lacks a loop for freewheeling, which is caused by the inductor being used to suppress an overshooting current in discharging the overcharged second capacitor.

Figure 6A:
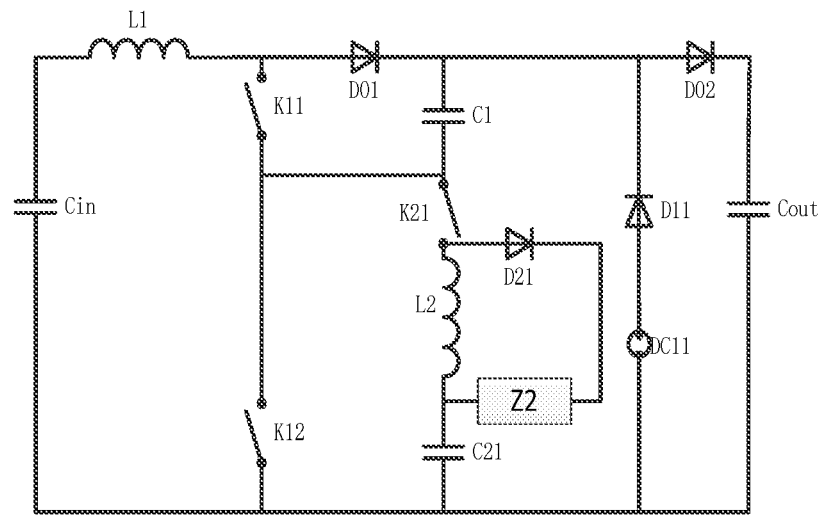
FIGS. 6a to 8d are nine specific schematic structural diagrams of main circuits of three-level boost apparatuses according to another embodiment of the present disclosure.

The discharge branch includes a second diode and a second impedor that are connected in series, such as D21 and Z2 shown in FIG. 6a. The second impedor Z2 may be a resistor (such as R2 shown in FIG. 6b), a capacitor (not shown), or a combination (not shown) of a resistor and a capacitor.

Figure 6B:
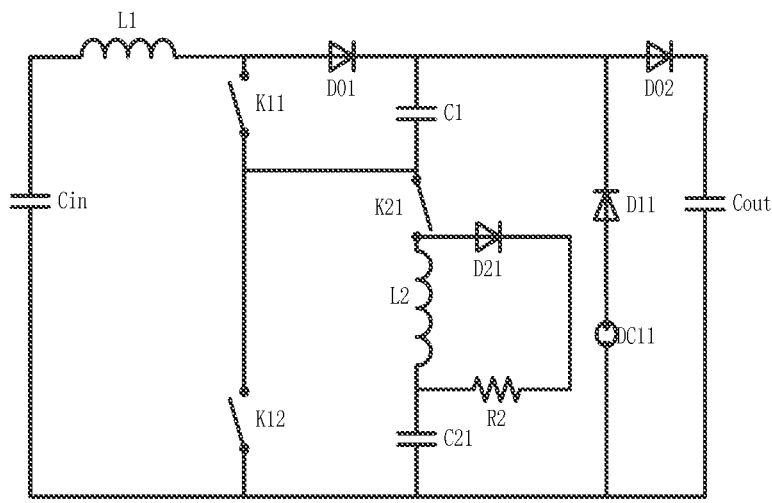

In practice, positions of the second diode and the second impedor may be exchanged, which are not limited to the cases shown in FIG. 6a and FIG. 6b, and fall within the protection scope of the present disclosure. FIG. 6a and FIG. 6b both illustrates on the basis of the topology shown in FIG. 4c. Structures of the discharge branches in other topologies can be obtained by analogy, and are not enumerated for illustration herein.

Other principles are same as those of the above embodiments, and are not further described herein.

In the solutions shown in FIG. 6a and FIG. 6b, power in the inductor L2 for freewheeling needs to be released via a resistor or the like, and additional losses would be caused. Therefore, another multi-level boost apparatus is provided according to another embodiment of the present disclosure. Preferably, on the basis of the aforementioned embodiment, the discharge branch includes a second diode and a second power source that are connected in series. The second power source is configured to receive power from the inductor.

Figure 7A:
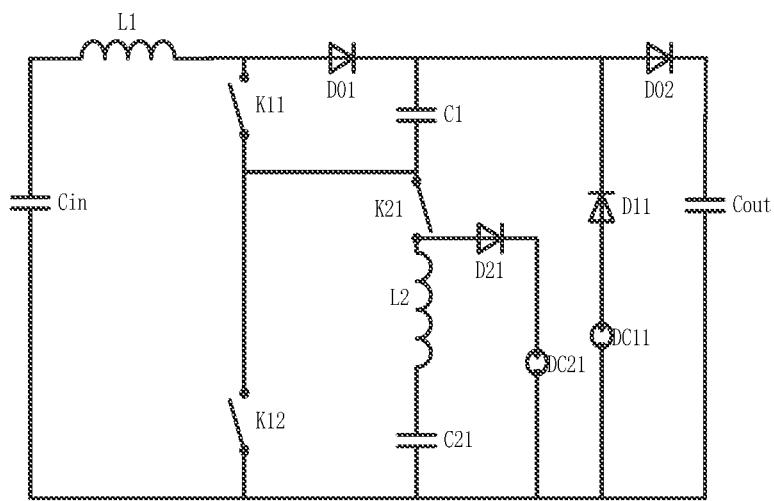

Referring to FIG. 7a, the discharge branch for the inductor L2 includes a second diode D21 and a second power source DC21. The second power source DC21 is capable to receive power from the inductor L2 via the second diode D21, and reuse the power.

More preferably, in a case that the fourth branch includes multiple output capacitors that are connected in series, the second power source includes all or part of the output capacitors in the fourth branch. A discharge channel can be provided for the second capacitor in a case that the system is shut down, improving security of the system.

Figure 7B:
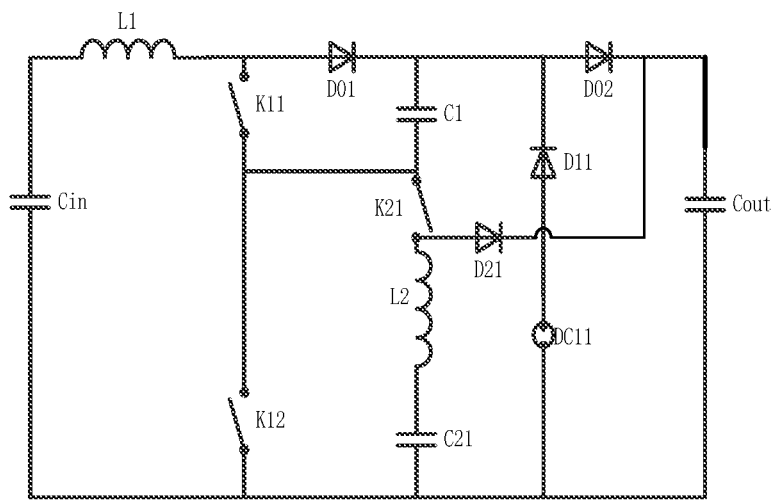
Figure 7C:
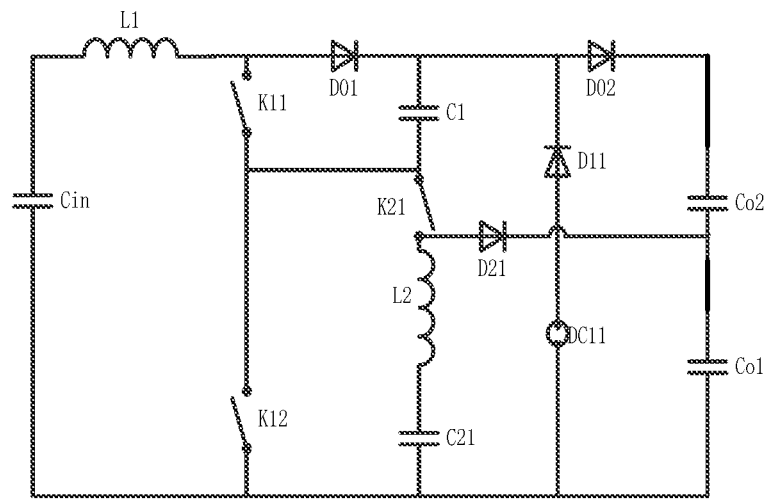

As shown in FIG. 7b, the second diode D21 is capable to feed power from the inductor L2 back to a main bus (Cout may be an equivalent form of a capacitor or multiple capacitors). As shown in FIG. 7c, the second diode D21 is capable to feed power from the inductor L2 back to a part (Co1) of the bus. Moreover, the second diode D21 is capable to provide a discharge loop for the second capacitor C21, in a case that the system is powered off.

Other structural topologies of discharge branches with a power source can be obtained by analogy, and are not enumerated for illustration herein.

In practice, with a combination of the voltage dividing module, the clamp branch with a power supply and the discharge branch with power supply, it can be ensured that a voltage-division problem of each first switch at the start-up, an impulse-current problem that is apt to occur in discharging of the second capacitor, an energy-recovery problem of the a freewheeling of the inductor in the voltage dividing module, an energy-releasing problem of the second capacitor at shutdown of the system, and a withstand-voltage problem of the corresponding second switch are all solved.

Figure 8A:
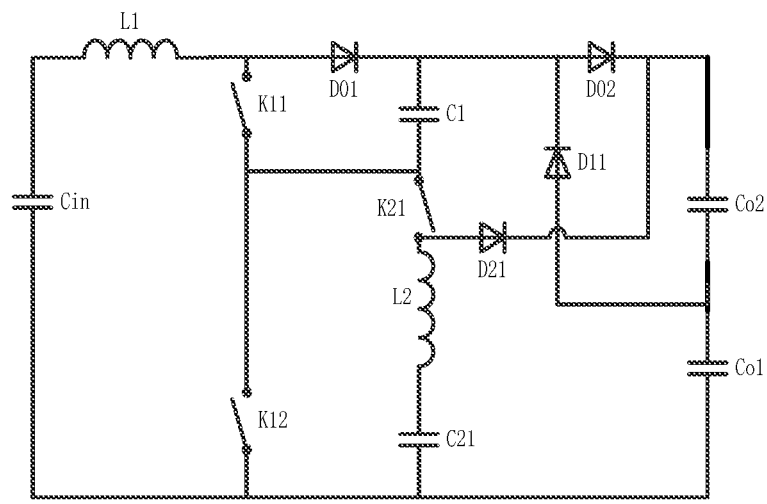
Figure 8B:
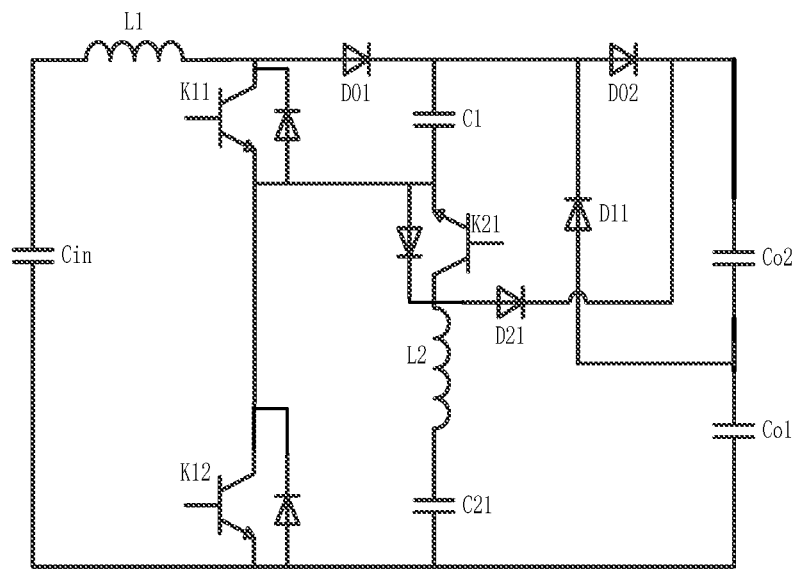
Figure 8C:
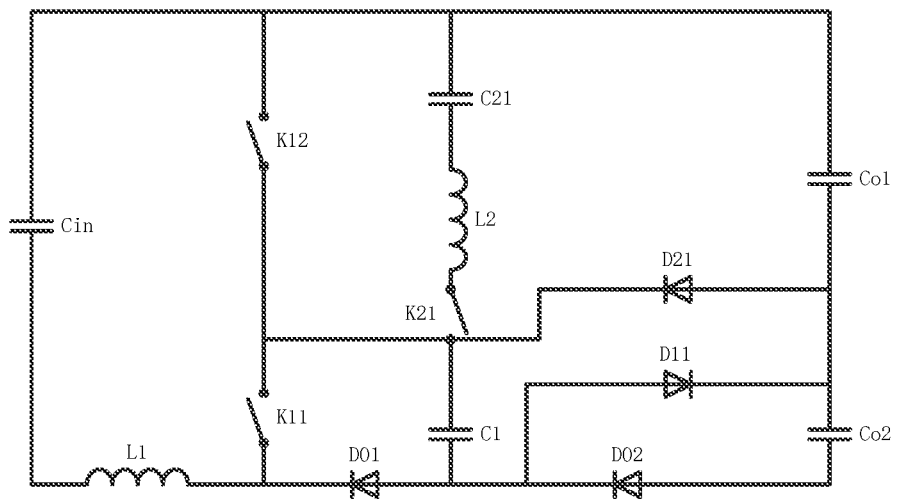

The solution shown in FIG. 8a can be obtained by combining the inductor L2 and the discharge branch of L2 in FIG. 7b with FIG. 3c. FIG. 8b shows a solution in which each switch transistor is replaced with a reverse-conducting switching device IGBT. FIG. 8c is a dual topology of FIG. 8a. Topologies for more levels can be obtained by analogy, and are not shown by enumeration herein.

Figure 8D:
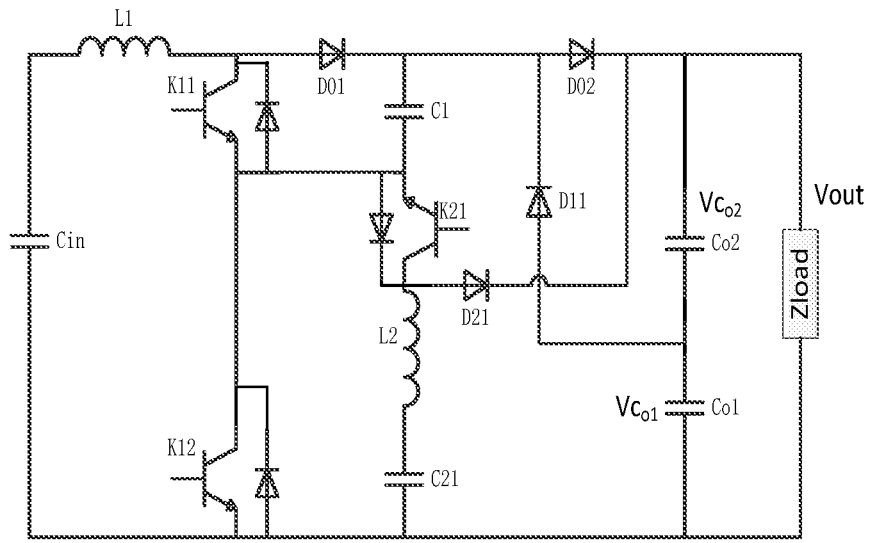

Hereinafter FIG. 8b is taken as an example to illustrate an operating process and a control strategy of the controller under the several typical operating conditions as follows. An output load Zload is added on the basis of FIG. 8b, as shown in FIG. 8d. To facilitate explanation, it is set that C1=C21, 3×Co2=Co1 and L2<<L1. A specific implementation is not limited thereto, and adjustment may be made according to a practical requirement, which all fall within the protection scope of the present disclosure.

Figure 9A:
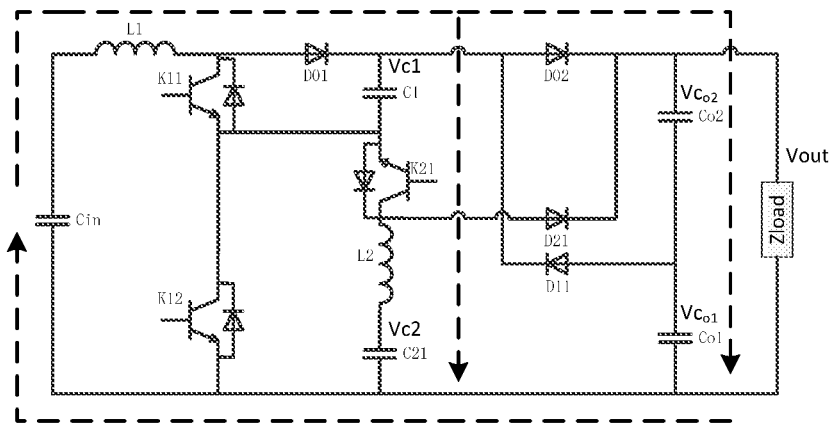
FIG. 9a is a schematic diagram of current flowing directions in a main circuit of a three-level boost apparatus according to another embodiment of the present disclosure.
Figure 9B:
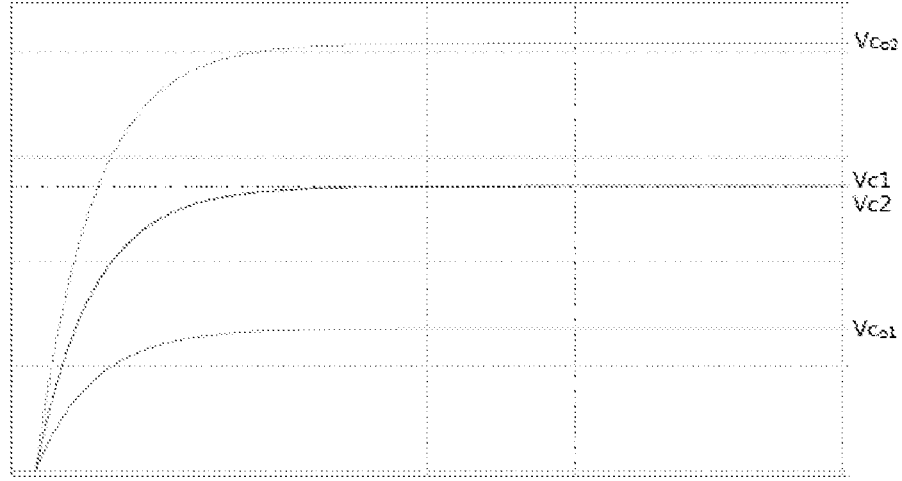
FIG. 9b is a schematic diagram of simulation of capacitor voltages in a main circuit of a three-level boost apparatus according to another embodiment of the present disclosure.

Specifically, a first operating condition is that Vin is switched in in case of Vout=Vc1=Vc2=0. Firstly, the two first switches K11 and K12 in the first branch are controlled to be turned off. L2 plus C21, Co1 and Co2 are respectively charged by Vin via a current limiting resistor (not shown) and L1. Since the L2 is designed to be much smaller than L1, a voltage drop on L2 can be neglected. Moreover, an oscillation voltage formed between L1 and C1, L2 plus C21, Co1 and Co2 is small due to existence of starting resistance and the load Zload. A current loop is shown in FIG. 9a. Voltages after reaching a steady state are Vc1=Vc2=Vin/2, Vout=Vin, 4×Vco2=3×Vin and 4×Vco1=Vin. A simulation result is shown in FIG. 9b. Then, the main circuit may be controlled to enter a normal operating mode.

Figure 10A:
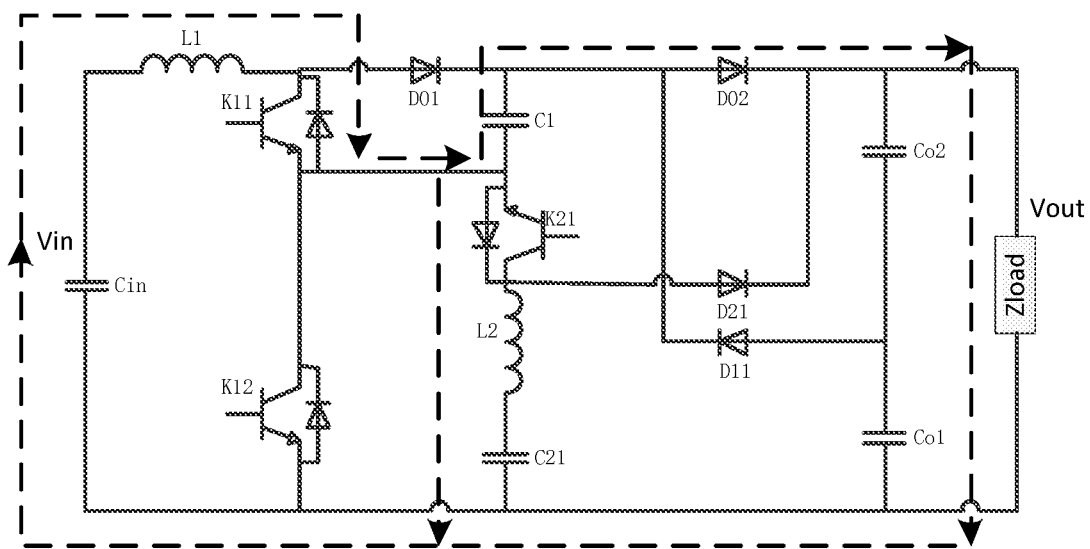
FIGS. 10a to 13 are various schematic diagrams of current flowing directions in a main circuit of a three-level boost apparatus according to another embodiment of the present disclosure.
Figure 10B:
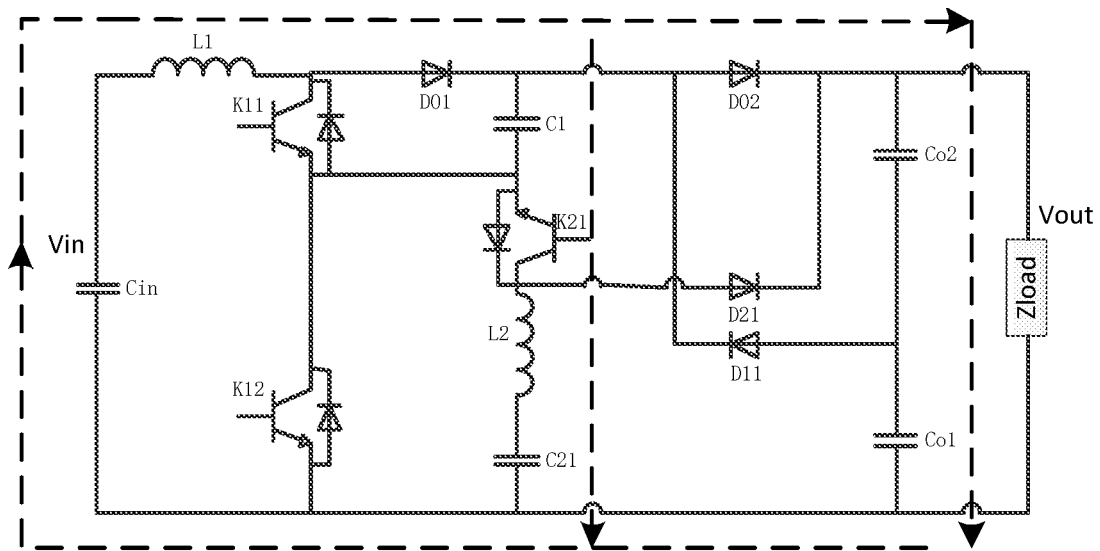
Figure 10C:
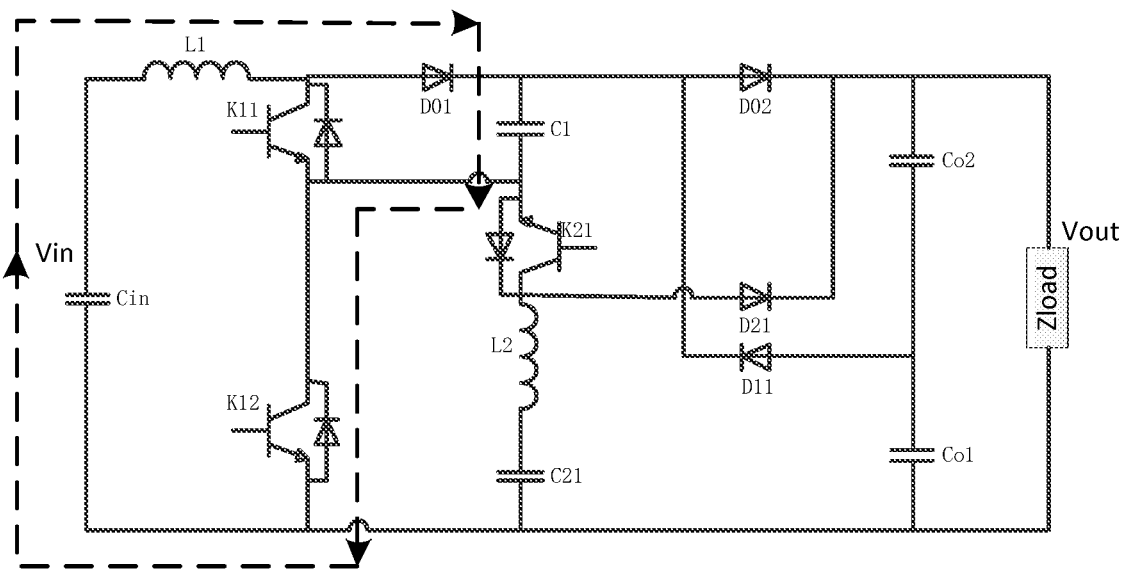

A second operating condition is that Vin is switched in, in case of Vout/2≤Vin≤Vout and Vc1=Vc2=0. Initially, a process for charging C1 and C21 is same as the first operating condition. Namely, firstly two first switches K11 and K12 in the first branch are both controlled to be turned off. Due to Vin≤Vout, the output voltage is not charged. A voltage relationship of relevant nodes is Vout≤2×Vin, Vco1=Vout/4, Vc1=Vc2=Vin/2, Vco1≤Vc1 and Vco1≤Vc2. Then after there is Vc1=Vc2=Vin/2, the two first switches K11 and K12 in the first branch are controlled to be pulsingly turned on in an interleaved manner (a waveform of the pulses is shown in FIG. 5) until there is Vc1+Vc2=Vout, and the main circuit is controlled to enter the normal operating mode. FIG. 10a shows that K11 is turned on and K12 is turned off. L1 is charged by Vin, C1 is discharged by Vin and C21 is charged by Vin simultaneously. FIG. 10b shows that K11 and K12 are both turned off. C1 and C21 are charged by L1. FIG. 10c shows that K12 is turned on and K11 is turned off. L1 is charged by Vin and C1 is charged by Vin simultaneously.

Figure 11A:
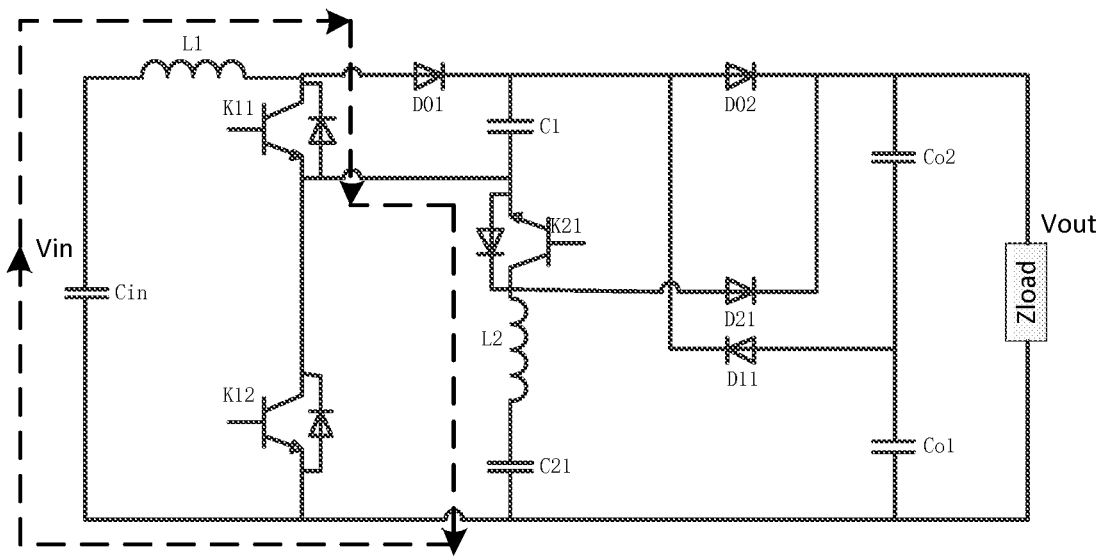
Figure 11B:
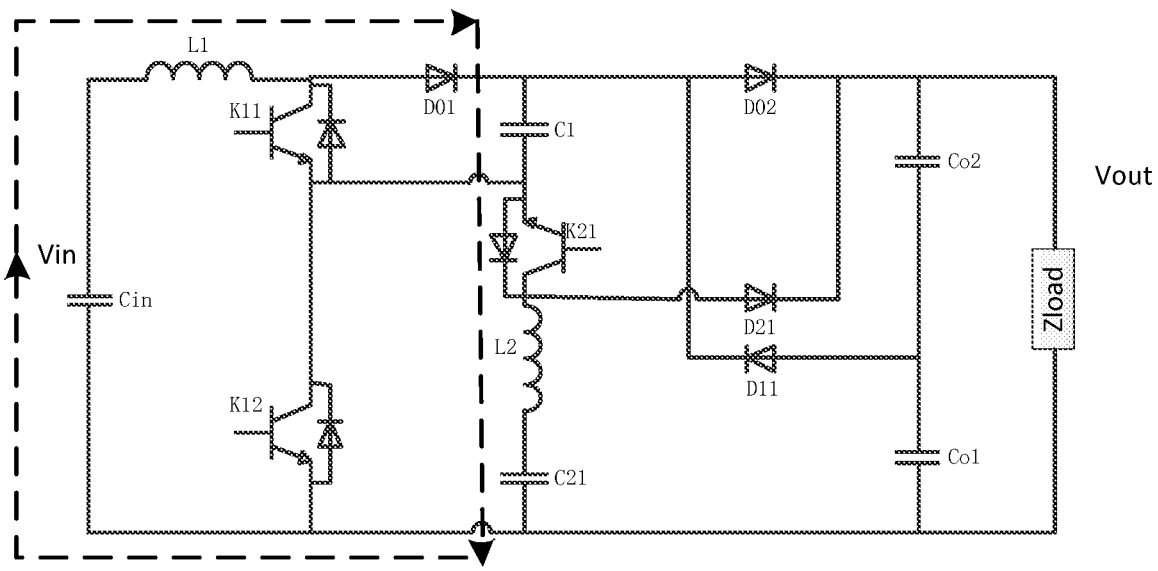

A third operating condition 3 is that Vin is switched in, in case of Vout/4≤Vin≤Vout/2 and Vc1=Vc2=0. Initially, a process for charging C1 and C21 is same as that at the beginning of the second operating condition 2. Namely, firstly the two first switches K11 and K12 in the first branch are both controlled to be turned off. Since Vin is low and the voltage across C1 is not higher than the voltage across Co1, there would be a problem that Co1 directly charges C1 in a case that pulsed charging is performed as the second operating condition 2. Devices D11 and K12 in the loop is apt to be damaged, since impedance of the loop is extremely low in such case. Therefore, C1 should be pre-charged under a special logic, and the start-up process of the second operating condition is not entered until the voltage across C1 is higher than the voltage across Co1. Namely, after Vc1=Vc2=Vin/2, the 2nd first switch K12 in the first branch is controlled to be turned off, and the 1st first switch K11 is controlled to be turned on pulsingly. In a case that K11 is on, L1, L2 and C21 are charged by Vin, and directions of current is shown in FIG. 11a. In a case that K11 is off, C1 and C21 are charged by L1, the directions of current is shown in FIG. 11b. Charging is repeated between the two modes in FIG. 11a and FIG. 11b, thereby achieving a boost charge of C1 until Vc1>Vco1. Then, the two first switches K11 and K12 in the first branch are controlled to be pulsingly turned on in an interleaved manner until Vc1+Vc2=Vout. Afterwards, the main circuit is controlled to enter the normal operating mode.

The fourth operating condition 4 is that the second capacitor C21 is discharged in a case that the main circuit is in the normal operating mode and there is Vc1=Vout/2<Vc2. The 2nd first switch K12 in the first branch is controlled to be turned off, the 1st first switch K11 is controlled to be turned on pulsingly with a period T1, and the controllable switch K21 is controlled to be turned on pulsingly with a period T2. The period T2 is smaller than the period T1. In such process, there may be four situations as shown in Table 1, and diagrams of flowing directions of current in the situations are shown in FIGS. 12a, 12b, 12c and 12d. L2 can effectively suppress a discharge current, and power in L2 is fed back to the output terminal via D21, thereby achieving discharging without losses.

TABLE 1

Figure 12A:
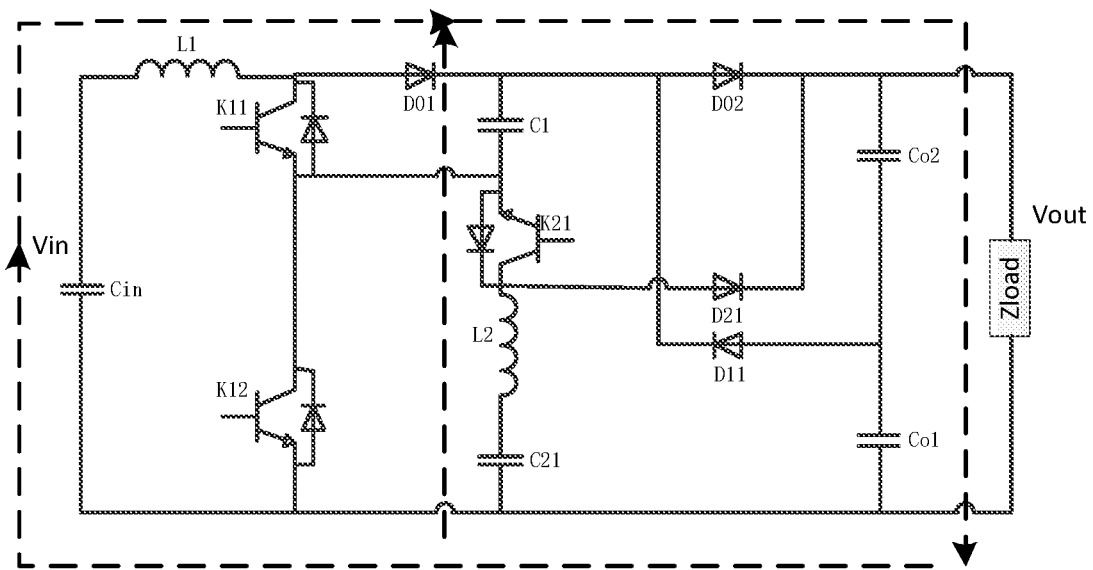
Figure 12B:
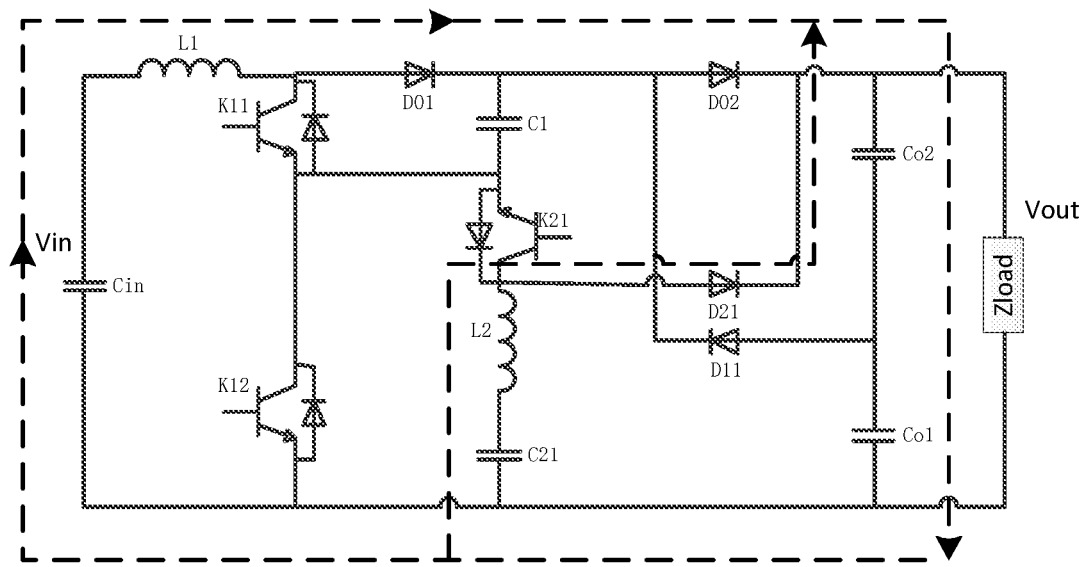
Figure 12C:
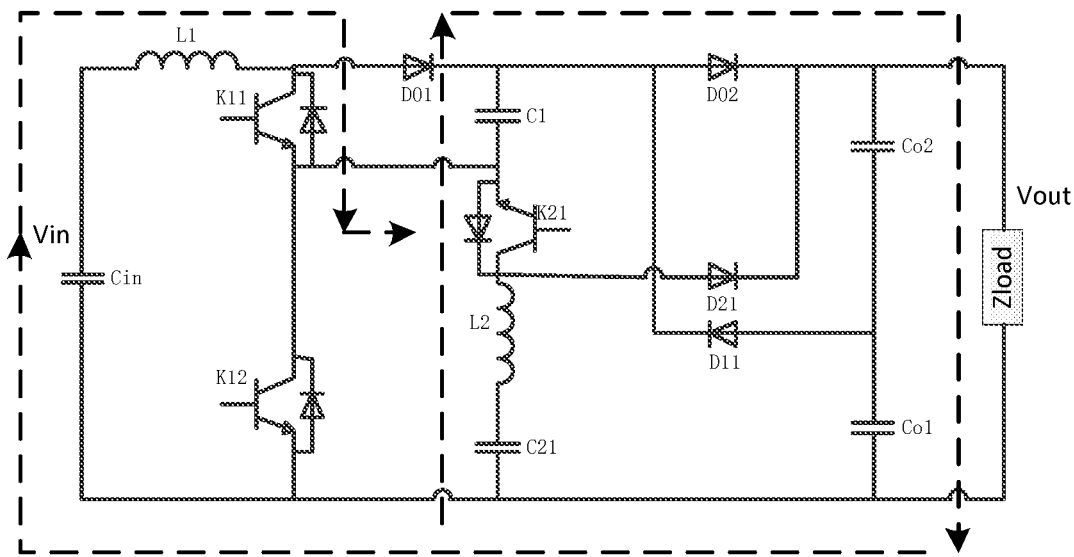
Figure 12D:
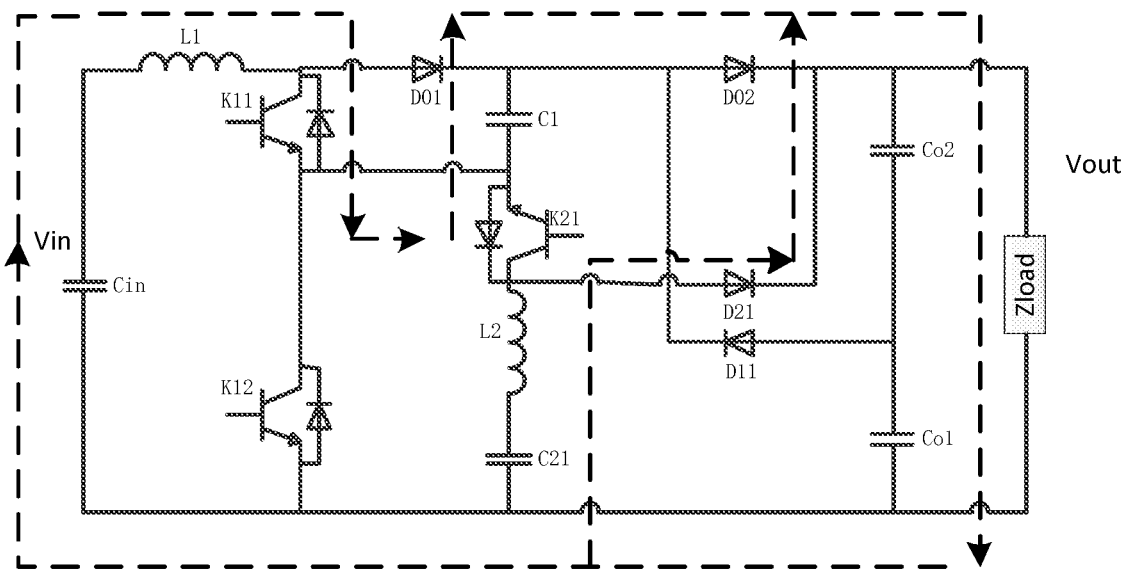

| K11 | K12 | K21 | Current flow diagram |
|---|---|---|---|
| OFF | OFF | ON | FIG. 12a |
| OFF | OFF | OFF | FIG. 12b |
| ON | OFF | ON | FIG. 12c |
| ON | OFF | OFF | FIG. 12d |

Figure 13:
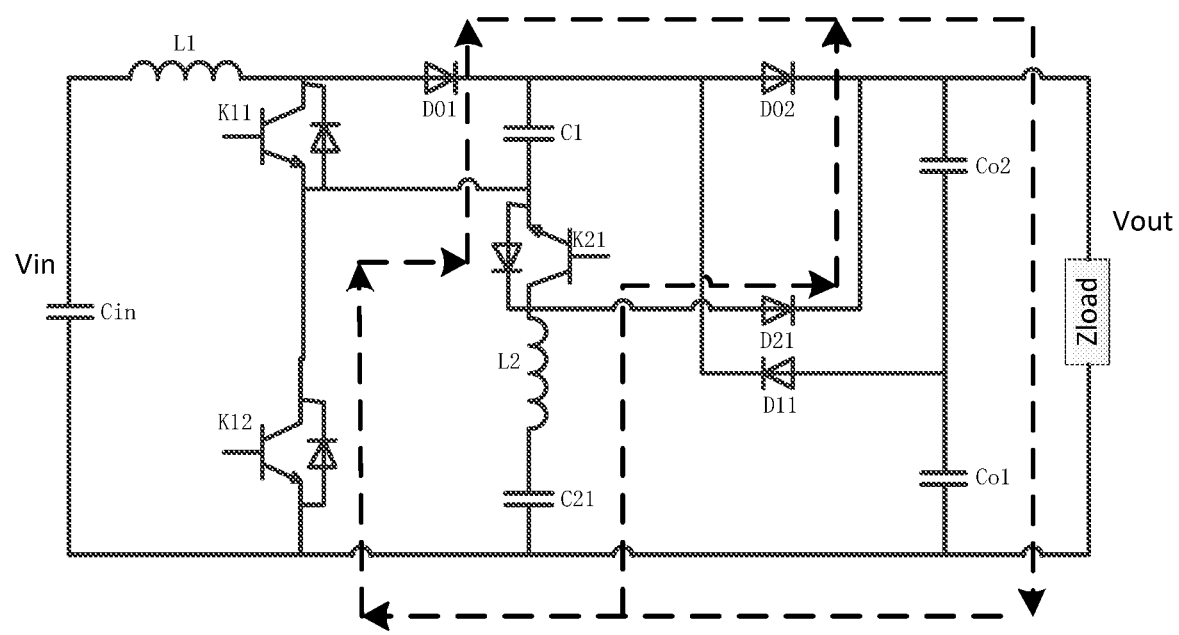

A fifth operating condition 5 is that Vin is removed at a certain moment in case of the normal operating condition of the main circuit. Internal energy storage devices of the system are discharged via some special discharge circuits at a bus side, to protect safety of maintenance personnel. In a case that both voltages Vin and Vout in the main circuit are not lower than a sum of the voltages across C1 and C21, C1 and C21 do not have relevant discharge loop. In a case that Vout is lower than the sum of the voltages across C1 and C21, C1 is discharged by connecting to the output terminal via K12 and D02, and C21 is discharged by connecting to the output terminal through D21. Reference is made to FIG. 13 for flowing directions of current.

Vout is the voltage between the two terminals of the fourth branch, namely, the output voltage of the main circuit. Vc1 is the voltage between the two terminals of the first capacitor. Vc2 is the voltage between the two terminals of the second capacitor. Vin is the input voltage of the multi-level boost apparatus. Vco1 is the voltage between the two terminals of the output capacitor that is connected to the input capacitor Cin.

It is noted that C1=C21 and 3×Co2=Co1 is set as a specific example in this embodiment. It should be appreciated that relationships between C1 and C21 and between Co1 and Co2 are not limited thereto. For example, Co2 may be N times Co1, where N≥2, in other embodiments of the present disclosure.

Other principles are same as the above embodiment, and are not further described herein.

The embodiments of the present disclosure are described in a progressive manner, and each embodiment places emphasis on the difference from other embodiments. Therefore, one embodiment can refer to other embodiments for the same or similar parts.

The foregoing embodiments are only preferred embodiments of the present disclosure, and do not limit the present disclosure in any form. The preferred embodiments according to the disclosure are disclosed above, and are not intended to limit the present disclosure. With the method and technical content disclosed above, those skilled in the art can make some variations and improvements to the technical solutions of the present disclosure, or make some equivalent variations on the embodiments without departing from the scope of technical solutions of the present disclosure. All simple modifications, equivalent variations and improvements made based on the technical essence of the present disclosure without departing the content of the technical solutions of the present disclosure fall within the protection scope of the technical solutions of the present disclosure.

The invention claimed is:

1. A multi-level boost apparatus, wherein a main circuit of the multi-level boost apparatus comprises an input capacitor, an input inductor, a first branch, a second branch, a third branch, a fourth branch, and N−1 clamp branches;
wherein N is a positive integer greater than 1; and
wherein:
a terminal of the input inductor is connected to a terminal of the input capacitor, and another terminal of the input inductor is connected to a terminal of the first branch and a terminal of the second branch;
the first branch comprises N first switches sequentially connected in series, a first one of the N first switches is connected to the input inductor;
the second branch comprises N second switches sequentially connected in series, a first one of the N second switches is connected to the input inductor, and a common node between the first one of the N second switches and a second one of the N second switches is connected to a terminal of the third branch;
the third branch comprises N voltage dividing modules sequentially connected in series, the N voltage dividing modules are configured to divide a voltage across the third branch, and a first one of the N voltage dividing modules comprises a first capacitor;
for each positive integer i that is greater than 1 and smaller than or equal to N:
a common node between an (i−1)-th one of the N voltage dividing modules and an i-th one of the N voltage dividing modules is connected to a common node between an (i−1)-th one of the N first switches and an i-th one of the N first switches; and
a common node between an (i−1)-th one of the N second switches and an i-th one of the second switches is connected to a terminal of an (i−1) one of the N−1 clamp branches, and the (i−1) one of the N−1 clamp branches is configured to reduce a voltage on the i-th one of the second branch;
another terminal of the second branch is connected to a terminal of the fourth branch, the terminal of the fourth branch and another terminal of the fourth branch are output terminals of the main circuit, and the fourth branch comprises at least one output capacitor; and
another terminal of the first branch, another terminal of the third branch, the another terminal of the fourth branch, and another terminal of each of the N−1 clamp branches are connected to another terminal of the input capacitor,
wherein N≥2;
wherein the i-th one of the N voltage dividing modules comprises a controllable switch and a second capacitor that are connected in series, for each positive integer i that is greater than 1 and smaller than or equal to N, and the second capacitor is charged in a default state of the controllable switch; and
wherein in case of N being greater than 2:
the multi-level boost apparatus further comprises N−1 connection capacitors; and
for each positive integer j that is smaller than N−1:
a terminal of a j-th one of the N−1 connection capacitors is connected to a common node between a (j+1)-th one of the N second switches and a (j+2)-th one of the N second switches; and
another terminal of the j-th one of the N−1 connection capacitors is connected to a common node between a (j+1)-th one of the N voltage dividing modules and a (j+2)-th one of the N voltage dividing modules.

2. The multi-level boost apparatus according to claim 1, wherein:

each of the N−1 the clamp branches comprises a first diode and a first power source, and the first power source is configured to reduce a voltage across the i-th one of the second switches.

3. The multi-level boost apparatus according to claim 1, wherein the fourth branch comprises N output capacitors sequentially connected in series, a first one of the N output capacitors is connected to the input capacitor, and an N-th one of the output capacitors is connected to the second branch, and each of the N−1 clamp branches comprises a first diode; and
wherein:
the input inductor and the second branch are arranged on a positive cable of the multi-level boost apparatus, and a cathode of the first diode in the (i−1)-th one of the N−1 clamp branches is connected to the common node between the (i−1)-th one of the N second switches and the i-th one of the N second switches, and an anode of the first diode in the (i−1)-th one of the N−1 clamp branches is connected to a common node between an (i−1)-th one of the N output capacitors and an i-th one of the N output capacitors, for each positive integer i that is greater than 1 and smaller than or equal to N; or
the input inductor and the second branch are arranged on a negative cable of the multi-level boost apparatus, and an anode of the first diode in the (i−1)-th one of the N−1 clamp branches is connected to the common node between the (i−1)-th one of the N second switches and the i-th one of the N second switches, and a cathode of the first diode in the (i−1)-th one of the N−1 clamp branches is connected to a common node between an (i−1)-th one of the N output capacitors and an i-th one of the N output capacitors, for each positive integer i that is greater than1 and smaller than or equal to N.

4. The multi-level boost apparatus according to claim 1, wherein:
the i-th one of the N voltage dividing modules further comprises a first impedor connected in series with the controllable switch and the second capacitor, for each positive integer i that is greater than 1 and smaller than or equal to N; and
the first impedor is a resistor, an inductor or a capacitor, or is a combination of at least two of a resistor, an inductor and a capacitor.

5. The multi-level boost apparatus according to claim 4, wherein N is equal to 2, the fourth branch comprises two output capacitors connected in series, and
wherein a controller of the multi-level boost apparatus is configured to:
control the two first switches in the first branch to be turned off in response to Vin being switched in and Vout=Vc1=Vc2=0, and then control the main circuit to enter a normal operating mode in response to Vout=Vin;
control the two first switches in the first branch to be turned off in response to Vin being switched in, Vout/2≤Vin≤Vout and Vc1=Vc2=0; then control the two first switches in the first branch to be pulsingly turned on in an interleaved manner in response to Vc1=Vc2=Vin/2, until Vc1+Vc2=Vout; and then control the main circuit to enter the normal operation mode in response to Vc1+Vc2=Vout;
control the two first switches in the first branch to be turned off in response to Vin being switched in, Vout/4≤Vin≤Vout/2 and Vc1=Vc2=0; then control a second one of the two first switches in the first branch to be turned off, and the first one of the two first switches be turned on pulsingly, in response to Vc1=Vc2=Vin/2; then control the two first switches in the first branch to be pulsingly turned on in an interleaved manner in response to Vc1>Vco1, until Vc1+Vc2=Vout; and then control the main circuit to enter the normal operation mode in response to Vc1+Vc2=Vout; and control the second one of the two first switches in the first branch to be turned off, control the first one of the two first switches to be turned on pulsingly, and control the controllable switch to be turned on, to discharge the second capacitor, in response to Vc1=Vout/2<Vc2 and the main circuit being in the normal operation mode; and wherein Vout is a voltage across the fourth branch, Vc1 is a voltage across the first capacitor, Vc2 is a voltage across the second capacitor, Vin is an input voltage of the multi-level boost apparatus, Vco1 is a voltage across one of the two output capacitors that is connected to the input capacitor, the first capacitor and the second capacitor are equal in capacitance, and capacitance of the one of the two output capacitors is three times the capacitance of another of the two output capacitors.

6. The multi-level boost apparatus according to claim 4, wherein:
the first impedor is the inductor; and
the i-th one of the N voltage dividing module further comprises a discharge branch configured to provide a discharge loop for the inductor, for each positive integer i that is greater than 1 and smaller than or equal to N.

7. The multi-level boost apparatus according to claim 6, wherein:
the discharge branch comprises a second diode and a second impedor that are connected in series, and
the second impedor is a resistor, a capacitor, or a combination of a resistor and a capacitor.

8. The multi-level boost apparatus according to claim 6, wherein:
the discharge branch comprises a second diode and a second power source that are connected in series, and
the second power source is configured to receive power from the inductor.

9. The multi-level boost apparatus according to claim 8, wherein:
the fourth branch comprises a plurality of output capacitors sequentially connected in series; and
the second power source comprises all or a part of the plurality of output capacitors in the fourth branch.

10. The multi-level boost apparatus according to claim 9, wherein N is equal to 2, and the fourth branch comprises two output capacitors connected in series;
wherein a controller of the multi-level boost apparatus is configured to:
control the two first switches in the first branch to be turned off in response to Vin being switched in and Vout=Vc1=Vc2=0, and then control the main circuit to enter a normal operating mode in response to Vout=Vin;
control the two first switches in the first branch to be turned off in response to Vin being switched in, Vout/2≤Vin≤Vout and Vc1=Vc2=0; then control the two first switches in the first branch to be pulsingly turned on in an interleaved manner in response to Vc1=Vc2=Vin/2, until Vc1+Vc2=Vout; and then control the main circuit to enter the normal operation mode in response to Vc1+Vc2=Vout;

control the two first switches in the first branch to be turned off in response to Vin being switched in, Vout/4≤Vin≤Vout/2 and Vc1=Vc2=0; then control a second one of the two first switches in the first branch to be turned off, and the first one of the two first switches be turned on pulsingly, in response to Vc1=Vc2=Vin/2; then control the two first switches in the first branch to be pulsingly turned on in an interleaved manner in response to Vc1>Vco1, until Vc1+Vc2=Vout; and then control the main circuit to enter the normal operation mode in response to Vc1+Vc2=Vout; and control the second one of the two first switches in the first branch to be turned off, control the first one of the two first switches to be turned on pulsingly with a period of T1, and control the controllable switch to be turned on pulsingly with a period of T2, to discharge the second capacitor, in response to Vc1=Vout/2<Vc2 and the main circuit being in the normal operation mode, wherein T2 is smaller than T1; and wherein Vout is a voltage across the fourth branch, Vc1 is a voltage across the first capacitor, Vc2 is a voltage across the second capacitor, Vin is an input voltage of the multi-level boost apparatus, Vco1 is a voltage across one of the two output capacitors that is connected to the input capacitor, the first capacitor and the second capacitor are equal in capacitance, and capacitance of the one of the two output capacitors is three times the capacitance of another of the two output capacitors.

11. The multi-level boost apparatus according to claim 1, wherein the N first switches are reverse-conducting transistors, the N second switches are diodes, and each controllable switch is a mechanical switch or a reverse-conducting transistor; and
wherein:
the input inductor and the second branch are arranged on a positive cable of the multi-level boost apparatus, and the common node between the (i−1)-th one of the N second switches and the i-th one of the N second switches is a node connecting a cathode of an (i−1)-th one of the diodes and an anode of an i-th one of the diodes, for each positive integer i that is greater than 1 and smaller than or equal to N; or
the input inductor and the second branch are arranged on a negative cable of the multi-level boost apparatus, and the common node between the (i−1)-th one of the N second switches and the i-th one of the N second switches is a node connecting between an anode of an (i−1)-th one of the diodes and a cathode of an i-th one of the diodes, for each positive integer i that is greater than 1 and smaller than or equal to N.

12. A multi-level boost apparatus, wherein a main circuit of the multi-level boost apparatus comprises an input capacitor, an input inductor, a first branch, a second branch, a third branch, a fourth branch, and N−1 clamp branches;
wherein N is a positive integer greater than 1; and
wherein:
a terminal of the input inductor is connected to a terminal of the input capacitor, and another terminal of the input inductor is connected to a terminal of the first branch and a terminal of the second branch;

the first branch comprises N first switches sequentially connected in series, a first one of the N first switches is connected to the input inductor;

the second branch comprises N second switches sequentially connected in series, a first one of the N second switches is connected to the input inductor, and a common node between the first one of the N second switches and a second one of the N second switches is connected to a terminal of the third branch;

the third branch comprises N voltage dividing modules sequentially connected in series, the N voltage dividing modules are configured to divide a voltage across the third branch, and a first one of the N voltage dividing modules comprises a first capacitor;

for each positive integer i that is greater than 1 and smaller than or equal to N:

a common node between an (i−1)-th one of the N voltage dividing modules and an i-th one of the N voltage dividing modules is connected to a common node between an (i−1)-th one of the N first switches and an i-th one of the N first switches; and a common node between an (i−1)-th one of the N second switches and an i-th one of the N second switches is connected to a terminal of an (i−1) one of the N−1 clamp branches, and the (i−1) one of the N−1 clamp branches is configured to reduce a voltage on the i-th one of the second branch;

another terminal of the second branch is connected to a terminal of the fourth branch, the terminal of the fourth branch and another terminal of the fourth branch are output terminals of the main circuit, and the fourth branch comprises at least one output capacitor; and another terminal of the first branch, another terminal of the third branch, the another terminal of the fourth branch, and another terminal of each of the N−1 clamp branches are connected to another terminal of the input capacitor, wherein N=2, and wherein:

a second one of the two voltage dividing modules comprises a first controllable switch and a first resistor that are connected in series, and a common node between the first one of the two dividing modules and the second one of the two dividing modules are connected via a second controllable switch to a common node between the first one of the two first switches and a second one of the two first switches.

13. The multi-level boost apparatus according to claim 12, wherein the N first switches are reverse-conducting transistors, the N second switches are diodes, and each controllable switch is a mechanical switch or a reverse-conducting transistor; and wherein:

the input inductor and the second branch are arranged on a positive cable of the multi-level boost apparatus, and the common node between the (i−1)-th one of the N second switches and the i-th one of the N second switches is a node connecting a cathode of an (i−1)-th one of the diodes and an anode of an i-th one of the diodes, for each positive integer i that is greater than 1 and smaller than or equal to N; or the input inductor and the second branch are arranged on a negative cable of the multi-level boost apparatus, and the common node between the (i−1)-th one of the N second switches and the i-th one of the N second switches is a node connecting between an anode of an (i−1)-th one of the diodes and a cathode of an i-th one of the diodes, for each positive integer i that is greater than 1 and smaller than or equal to N.

14. The multi-level boost apparatus according to claim 12, wherein:

each of the N−1 the clamp branches comprises a first diode and a first power source, and the first power source is configured to reduce a voltage across the i-th one of the second switches.

15. The multi-level boost apparatus according to claim 12, wherein the fourth branch comprises N output capacitors sequentially connected in series, a first one of the N output capacitors is connected to the input capacitor, and an N-th one of the output capacitors is connected to the second branch, and each of the N−1 clamp branches comprises a first diode; and wherein:

the input inductor and the second branch are arranged on a positive cable of the multi-level boost apparatus, and a cathode of the first diode in the (i−1)-th one of the N−1 clamp branches is connected to the common node between the (i−1)-th one of the N second switches and the i-th one of the N second switches, and an anode of the first diode in the (i−1)-th one of the N−1 clamp branches is connected to a common node between an (i−1)-th one of the N output capacitors and an i-th one of the N output capacitors, for each positive integer i that is greater than1 and smaller than or equal to N; or the input inductor and the second branch are arranged on a negative cable of the multi-level boost apparatus, and an anode of the first diode in the (i−1)-th one of the N−1 clamp branches is connected to the common node between the (i−1)-th one of the N second switches and the i-th one of the N second switches, and a cathode of the first diode in the (i−1)-th one of the N−1 clamp branches is connected to a common node between an (i−1)-th one of the N output capacitors and an i-th one of the N output capacitors, for each positive integer i that is greater than1 and smaller than or equal to N.

* * * * *